United States Patent
Meardi

(10) Patent No.: US 12,160,601 B2
(45) Date of Patent: Dec. 3, 2024

(54) QUANTIZATION OF RESIDUALS IN VIDEO CODING

(71) Applicant: V-NOVA INTERNATIONAL LIMITED, London (GB)

(72) Inventor: Guido Meardi, London (GB)

(73) Assignee: V-NOVA INTERNATIONAL LIMITED (GB)

( * ) Notice: Subject to any disclaimer, the term of this patent is extended or adjusted under 35 U.S.C. 154(b) by 86 days.

(21) Appl. No.: 17/441,040

(22) PCT Filed: Mar. 19, 2020

(86) PCT No.: PCT/GB2020/050725
§ 371 (c)(1),
(2) Date: Sep. 20, 2021

(87) PCT Pub. No.: WO2020/188282
PCT Pub. Date: Sep. 24, 2020

(65) Prior Publication Data
US 2022/0217345 A1    Jul. 7, 2022

(30) Foreign Application Priority Data

Mar. 20, 2019 (GB) ........................ 1903844
Mar. 23, 2019 (GB) ........................ 1904014
(Continued)

(51) Int. Cl.
*H04N 19/124* (2014.01)
*H04N 19/109* (2014.01)
(Continued)

(52) U.S. Cl.
CPC ......... *H04N 19/503* (2014.11); *H04N 19/109* (2014.11); *H04N 19/117* (2014.11);
(Continued)

(58) Field of Classification Search
CPC .. H04N 19/503; H04N 19/109; H04N 19/117; H04N 19/122; H04N 19/124;
(Continued)

(56) References Cited

U.S. PATENT DOCUMENTS 6,044,757 A * 4/2000 Mason ................ A47G 19/265
99/485
8,964,854 B2 2/2015 Tu et al.
(Continued)

FOREIGN PATENT DOCUMENTS

CA    2873499   *  5/2013
CN    101695132 B   6/2012
(Continued)

OTHER PUBLICATIONS

Lei Shawmin, Translation of JP 2001298366, Mar. 2001 (Year: 2001).*

(Continued)

*Primary Examiner* — Zaihan Jiang
(74) *Attorney, Agent, or Firm* — WORKMAN NYDEGGER

(57) ABSTRACT

According to aspects of the invention there is provided a method of encoding an input video into a plurality of encoded streams, wherein the encoded streams may be combined to reconstruct the input video. There may be provided an encoding method comprising: receiving an input video; downsampling the input video to create a downsampled video; instructing an encoding of the downsampled video using a base encoder to create a base encoded stream; instructing a decoding of the base encoded stream using a base decoder to generate a reconstructed video; comparing the reconstructed video to the downsampled video to create a first set of residuals; and, encoding the first set of residuals to create a first level encoded stream, (Continued)

including: applying a transform to the first set of residuals to create a first set of coefficients; applying a quantization operation to the first set of coefficients to create a first set of quantized coefficients; and applying an encoding operation to the first set of quantized coefficients, wherein applying the quantization operation comprises: adapting the quantization based on the first set of coefficients to be quantized, including varying a step-width used for different ones of the first set of coefficients, wherein a first set of parameters derived from the adapting is signalled to a decoder to enable dequantization of the first set of quantized coefficients.

20 Claims, 7 Drawing Sheets

(30) Foreign Application Priority Data

| | | |
|---|---|---|
| Mar. 29, 2019 | (GB) | 1904492 |
| Apr. 15, 2019 | (GB) | 1905325 |

(51) Int. Cl.

| | |
|---|---|
| H04N 19/117 | (2014.01) |
| H04N 19/122 | (2014.01) |
| H04N 19/13 | (2014.01) |
| H04N 19/132 | (2014.01) |
| H04N 19/136 | (2014.01) |
| H04N 19/172 | (2014.01) |
| H04N 19/176 | (2014.01) |
| H04N 19/177 | (2014.01) |
| H04N 19/18 | (2014.01) |
| H04N 19/184 | (2014.01) |
| H04N 19/30 | (2014.01) |
| H04N 19/44 | (2014.01) |
| H04N 19/503 | (2014.01) |
| H04N 19/60 | (2014.01) |
| H04N 19/82 | (2014.01) |

(52) U.S. Cl.
CPC ......... *H04N 19/122* (2014.11); *H04N 19/124* (2014.11); *H04N 19/13* (2014.11); *H04N 19/132* (2014.11); *H04N 19/136* (2014.11); *H04N 19/172* (2014.11); *H04N 19/176* (2014.11); *H04N 19/177* (2014.11); *H04N 19/18* (2014.11); *H04N 19/184* (2014.11); *H04N 19/30* (2014.11); *H04N 19/45* (2014.11); *H04N 19/60* (2014.11); *H04N 19/82* (2014.11)

(58) Field of Classification Search
CPC .... H04N 19/13; H04N 19/132; H04N 19/136; H04N 19/172; H04N 19/176; H04N 19/177; H04N 19/18; H04N 19/184; H04N 19/30; H04N 19/45; H04N 19/60; H04N 19/82
See application file for complete search history.

(56) References Cited

U.S. PATENT DOCUMENTS

| | | | | |
|---|---|---|---|---|
| 11,272,180 | B2* | 3/2022 | Nagumo | H04N 19/157 |
| 2003/0067637 | A1 | 4/2003 | Hannuksela | |
| 2004/0042549 | A1 | 3/2004 | Huang et al. | |
| 2007/0025441 | A1* | 2/2007 | Ugur | H04N 19/61 |
| | | | | 375/E7.157 |
| 2009/0148054 | A1 | 6/2009 | Kim et al. | |
| 2011/0110423 | A1 | 5/2011 | Kadono et al. | |
| 2011/0261888 | A1 | 10/2011 | Cammas et al. | |
| 2012/0151635 | A1* | 6/2012 | Coruzzi | C12N 15/8222 |
| | | | | 426/627 |
| 2012/0183076 | A1 | 7/2012 | Boyce | |
| 2012/0251015 | A1 | 10/2012 | Lim | |
| 2013/0044813 | A1 | 2/2013 | Boon | |
| 2013/0272406 | A1 | 10/2013 | Yu | |
| 2014/0031168 | A1* | 1/2014 | Yang | B60K 6/448 |
| | | | | 475/5 |
| 2014/0050271 | A1* | 2/2014 | Su | H04N 19/86 |
| | | | | 375/240.26 |
| 2014/0219346 | A1 | 8/2014 | Ugur | |
| 2016/0295211 | A1 | 10/2016 | Sato | |
| 2017/0127085 | A1 | 5/2017 | Sun et al. | |
| 2019/0251889 | A1* | 8/2019 | Hoffman | G06F 3/14 |
| 2022/0329802 | A1* | 10/2022 | Meardi | H04N 19/18 |

FOREIGN PATENT DOCUMENTS

| | | | |
|---|---|---|---|
| EP | 2822275 | * | 2/2013 |
| EP | 2090108 | | 6/2013 |
| JP | H05-308629 | | 11/1993 |
| JP | H11289542 | | 10/1999 |
| JP | 2001298366 | * | 3/2001 |
| JP | 3516622 B2 | | 4/2004 |
| JP | 2009141953 | | 6/2009 |
| JP | 2014132759 | | 7/2014 |
| WO | 2011/052215 | | 5/2011 |
| WO | 2012/048662 A1 | | 4/2012 |
| WO | 2012/142471 | | 10/2012 |
| WO | 2014/107255 | | 7/2014 |
| WO | 2015/098561 | | 7/2015 |
| WO | 2020/188282 | | 9/2020 |

OTHER PUBLICATIONS

H. Schwarz et al: "Overview of the Scalable Video Coding Extension of the H.264/AVC Standard", IEEE Transactions on Circuits and Systems for Video Technology, vol. 17, No. 9, Sep. 1, 2007 (Sep. 1, 2007), pp. 1103-1120, XP055378169, us ISSN: 1051-8215, DOI: 10.1109/TCSVT.2007.905532.

Heiko Schwarz et al: "Chapter 3: Block Structures and Parallelism Features in HEVC", In: "High Efficiency Video Coding (HEVC)", Aug. 23, 2014 (Aug. 23, 2014), Springer International Publishing, XP055614176, ISBN: 978-3-319-06894-7 pp. 49-90, DOI: 10.1007/978-3-319-06895-4-3.

International Search Report and Written Opinion for PCT/GB2020/050725 dated Jun. 2, 2020.

Jill Boyce et al: "Overview of SHVC: Scalable Extensions of the High Efficiency Video Coding (HEVC) Standard", IEEE Transactions on Circuits and Systems for Video Technology, Jan. 1, 2015 (Jan. 1, 2015), pp. 1-1, XP055210971, ISSN: 1051-8215, DOI: 10.1109/TCSVT.2015.2461951.

Madhukar Budagavi et al: "HEVC Transform and Quantization", Jun. 26, 2014 (Jun. 26, 2014), High Efficiency Video Coding (HEVC), Springer International Publishing, pp. 141-169, XP008181006, ISBN: 978-3-319-06894-7.

Yun Q Shi et al: "6.2 Features of 1-4,6-24 MPEG-1/2 Video Coding" In: "Image and Video Compression for Multimedia Engineering Fundamentals, Algorithms, and Standards" Dec. 20, 1999 (Dec. 20, 1999), Boca Raton, XP055694862, ISBN: 978-0-8493-3491-7 pp. 333-346, p. 337 figure 16.5 p. 340, last paragraph section 16.2.2.3 section 16.2.2.6.

Search and Examination Report for GB2312636.0 mailed Sep. 28, 2023.

Search and Examination Report for GB2312676.6 dated Oct. 5, 2023.

Ferrara S et al: "[LCEVC] —Suggested improvements to LCEVC CD", 129. MPEG Meeting; Jan. 13, 2020-Jan. 17, 2020; Brussels; (Motion Picture Expert Group or ISO/IEC JTC1/SC29/WG11), No. m52269, Jan. 12, 2020 (Jan. 12, 2020), XP030224869, Retrieved from the Internet: URL: http://phenix.int-evry.fr/mpeg/doc_end_user/documents/129_Brussels/wg11/m52269-v_2-m52269-%5BLCEVC%5DSuggestedimprovementstoLCEVCCDtext-v.1.zip Annex B-CD-20191105 [retrieved on Jan. 12, 2020].

(56) References Cited

OTHER PUBLICATIONS

"Working Draft of Low Complexity Enhancement Video Coding", 126. MPEG Meeting; Mar. 25, 2019-Mar. 29, 2019; Geneva; (Motion Picture Expert Group or ISO/IEC JTC1/SC29/WG11), No. n18454, Apr. 18, 2019 (Apr. 18, 2019), XP030208724, Retrieved from the Internet: URL: http://phenix.int-evry.fr/mpeg/doc_end_user/documents/126_Geneva/wg11/w18454.zip NI8454.docx [retrieved on Sep. 26, 2019].

Li X et al.: "Adaptive De-Quantization Offset", 5. JCT-VC Meeting; 96. MPEG Meeting; Mar. 25, 2019-Mar. 29, 2019; Geneva; (Joint Collaborative Team On Video Coding of ISO/IEC JTC1/SC29/WG11 and ITU-T SG.16 ); URL: HTTP://WFTP3.ITU.INT/AV-ARCH/JCTVC-SITE/, No. JCTVC-E091, Mar. 10, 2011 (Mar. 10, 2011), XP030008597.

GB2312670.9 Search & Exam report dated Sep. 12, 2023.
GB2312675.8 Search & Exam report dated Sep. 12, 2023.
JP2021-558489 Office Action.
Akiyuki TANIZAWA (1 other coauthor), "Video Coding with Adaptive Quantization Matrix Selection", IEICE Transaction, vol. J91-D, No. 11, the Institute of Electronics, Information and Communication Engineers, Nov. 1, 2008, pp. 2647-2658, ISSN: 1880-4535.

Supervising Editor Sakae OKUBO, "Textbook on H.265/HEVC", 1st Edition, Oct. 21, 2013, Impress Japan, pp. 198-201, ISBN: 978-6-8443-3468-2 (cited as well-known technique).

Yoshiyuki Yajima, "Next Generation Video Coding Technologies for Ultra Realistic Communication", IEICE Communications Society Magazine, vol. 2007, No. 2, Aug. 25, 2007, the Institute of Electronics, Information and Communication Engineers, pp. 141-166, [search: Feb. 26, 2020], Internet, <URL: https://www.jstage.jst.go.jp/article/bplus/2007/2/2007_2_2_141/_article/-char/ja/>, Online ISSN : 2186-0661, <DOI: https://doi.org/10.1587/bplus.2007.2_141> (cited to show common technical knowledge of those skilled in the art).

International Preliminary Report on Patentability received for PCT Patent Application No. PCT/GB2020/050725, mailed on Sep. 30, 2021, 11 pages.

GB2312647.7 Search and Examination Report dated Sep. 7, 2023.
GB2312674.1 Search and Examination Report dated Oct. 10, 2023.
GB2312680.8 Search Report dated Oct. 5, 2023.
Office Action received for Egypt Patent Application No. 2021091474, mailed on Jun. 15, 2024, 17 pages.

* cited by examiner

QUANTIZATION OF RESIDUALS IN VIDEO CODING

CROSS-REFERENCE TO RELATED APPLICATIONS

The present application is a 371 US Nationalization of International Patent Application No. PCT/GB2020/050725, filed Mar. 19, 2020, which claims priority to UK Patent Application Nos. 1903844.7, filed Mar. 20, 2019, 1904014.6, filed Mar. 23, 2019, 1904492.4, filed Mar. 29, 2019, and 1905325.5, filed Apr. 15, 2019, the entire disclosures of which are incorporated herein by reference.

BACKGROUND

A hybrid backward-compatible coding technology has been previously proposed, for example in WO 2014/170819 and WO 2018/046940, the contents of which are incorporated herein by reference.

A method is proposed therein which parses a data stream into first portions of encoded data and second portions of encoded data; implements a first decoder to decode the first portions of encoded data into a first rendition of a signal; implements a second decoder to decode the second portions of encoded data into reconstruction data, the reconstruction data specifying how to modify the first rendition of the signal; and applies the reconstruction data to the first rendition of the signal to produce a second rendition of the signal.

An addition is further proposed therein in which a set of residual elements is useable to reconstruct a rendition of a first time sample of a signal. A set of spatio-temporal correlation elements associated with the first time sample is generated. The set of spatio-temporal correlation elements is indicative of an extent of spatial correlation between a plurality of residual elements and an extent of temporal correlation between first reference data based on the rendition and second reference data based on a rendition of a second time sample of the signal. The set of spatio-temporal correlation elements is used to generate output data. As noted, the set of residuals are encoded to reduce overall data size.

Encoding applications have typically employed a quantization operation. By way of this compression process, in which each of one or more ranges of data values is compressed into a single value, allows the number of different values in a set of video data to be reduced, thereby rending that data more compressible. In this way, quantization schemes have been useful in some video for changing signals into quanta, so that certain variables can assume only certain discrete magnitudes. Typically a video codec divides visual data, in the form of a video frame, into discrete blocks, typically of a predetermined size or number of pixels. A transform is then typically applied to the blocks so as to express the visual data in terms of sums of frequency components. That transformed data can then be pre-multiplied by a quantization scale code, and then subjected to division element-wise by the quantization matrix, with the output elements of the division of each transformed, pre-multiplied element by the matrix element, then being rounded. The treatment of different transformed elements with divisors, namely different elements of a quantization matrix, is typically used to allow for those frequency elements that have a greater impact upon visual appearance of the video to a viewer to be effectively allotted more data, or resolution, than less perceptible components.

Optimisations are sought to further reduce overall data size while balancing the objectives of not compromising the overall impression on the user once the signal has been reconstructed; and, optimising processing speed and complexity.

SUMMARY OF THE INVENTION

According to a first aspect of the invention there is provided a method of encoding an input video into a plurality of encoded streams, wherein the encoded streams may be combined to reconstruct the input video, the method comprising: receiving an input video, which is typically a full-resolution input video; downsampling the input video to create a downsampled video; instructing an encoding of the downsampled video using a base encoder to create a base encoded stream; instructing a decoding of the base encoded stream using a base decoder to generate a reconstructed video; comparing the reconstructed video to the downsampled video to create a first set of residuals; and, encoding the first set of residuals to create a first level encoded stream, including: applying a transform to the first set of residuals to create a first set of coefficients; applying a quantization operation to the first set of coefficients to create a first set of quantized coefficients; and applying an encoding operation to the first set of quantized coefficients, wherein applying the quantization operation comprises: adapting the quantization based on the first set of coefficients to be quantized, including varying a step-width used for different ones of the first set of coefficients, wherein a first set of parameters derived from the adapting is signalled to a decoder to enable dequantization of the first set quantized coefficients.

The method may advantageously allow the efficiency of the encoding and decoding process to be improved, by way of altering the degree and/or manner of compression applied to the coefficients in the quantization process in dependence on any of a number of factors based upon the video data to be coded. Thus the way in which the typically lossy procedure of quantization is performed during encoding a video stream can be adapted in such a way that an appropriate balance between encoding or compression efficient and visually perceptible compression of the input video, which is a relation that may vary greatly across different video frames and streams, may be applied depending upon the nature and content of the input video. This adaptable form of quantization may be used in cooperation with a de-quantization process at a receiving decoder for instance, by way of signalling to the decoder the manner in which the quantizing has been performed, or the degree to which it has been altered from a default mode, for example, through transmission of parameters having values that represent or indicate that information.

With reference to the method according to the first aspect, the step of quantization may comprise adapting the quantization based on an analysis of the coefficients, which may be understood as being the output of the transform. In some embodiments the quantization may alternatively or additionally be adapted based on an analysis of data to be transformed. For example, residuals data such as the first set of residuals may be analysed for this purpose.

The adapting the quantization including varying the step-width used for different ones of the first set of coefficients typically involves using different quantization parameters for different coefficients in a coding block, or preferably different parameters for each coefficient in a coding block. For example, each of the A, H, V, and D (average, horizontal, vertical, and diagonal) coefficients, which are explained in more detail below, may have applied to them different quantization parameters. The transform may be a directional decomposition transform in some embodiments, which is also discussed in greater detail later in this disclosure. The coding block is typically a small N×N coding block, and transforms of this sort may comprise a small kernel or matrix that is applied to flattened coding units of residuals, for instance 2×2 or 4×4 blocks of residuals. Coding units may be arranged in tiles.

The method may also typically involve, when the downsampled video has been created, encoding the downsampled video using a first codec to create a base encoded stream; reconstructing a video from the encoded video to generate a reconstructed video; comparing the reconstructed video to the input video; and, creating one or more further encoded streams based on the comparison.

The first codec is typically a hardware-based codec, and preferably the first codec is AVC, HEVC, AV1, VP8, or VP9. This means that the encoder is typically a dedicated processor that uses a designed coding algorithm to perform the described process, as opposed to a software-encoder which is typically an encoding program that can be executed on a computing device. It will be understood that in this disclosure the terms first codec and base codec may be used interchangeably. The method may further comprise any one or more of: sending the base encoded stream, sending the first level encoded stream, and sending the second level encoded stream.

A step of encoding the first set of residuals, as noted above, may typically comprise: applying a transform to the set of residuals to create a set of coefficients; applying a quantization operation to the coefficients to create a set of quantized coefficients; and, applying an encoding operation to the quantized coefficients.

In some embodiments the method may involve the creation and encoding of a second set of residuals, from a corrected reconstructed video, and that second set of residuals can be transformed and quantized for the encoding input video. Preferably in such embodiments the method comprises decoding the first set of residuals to generate a decoded first set of residuals; correcting the reconstructed video using the decoded first set of residuals to generate a corrected reconstructed video; upsampling the corrected reconstructed video to generate an up-sampled reconstructed video; comparing the up-sampled reconstructed video to the input video to create a second set of residuals; and encoding the second set of residuals to create a second level encoded stream, including: applying a transform to the second set of residuals to create a second set of coefficients; applying a quantization operation to the second set of coefficients to create a second set of quantized coefficients; and applying an encoding operation to the second set of quantized coefficients, wherein applying the quantization operation comprises: adapting the quantization based on the second set of coefficients to be quantized, including varying a step-width used for different ones of the second set of coefficients, wherein a second set of parameters derived from the adapting is signalled to a decoder to enable dequantization of the quantized coefficients.

It will be understood that a step of encoding the second set of residuals typically comprises, as described similarly above: applying a transform to the second set of residuals to create a set of coefficients; applying a quantization operation to the coefficients to create a set of quantized coefficients; and, applying an encoding operation to the quantized coefficients.

In any of these embodiments, the aforementioned signalling of a set of parameters is preferably performed using a quantization matrix. The quantization matrix may be understood as an array of values that are respectively applied, typically by way of a division operation, to elements of the output of the transform. This signalling using such a matrix, whether for either one or both of the first and second sets of parameters, typically comprises transmitting a quantization matrix mode parameter indicating how values within the quantization matrix are to be applied to one or more of the first set of coefficients and the second set of coefficients.

The quantization matrix mode parameter may indicate, by way of taking one of a predefined set of parameter values, for example, one of the following modes: a first mode wherein the decoder is to use a set of values within the quantization matrix for both the first level encoded stream and the second level encoded stream; a second mode wherein the decoder is to use a set of values within the quantization matrix for the first level encoded stream; a third mode wherein the decoder is to use a set of values within the quantization matrix for the second level encoded stream; and a fourth mode wherein two quantization matrices are signalled for each of the first level encoded stream and the second level encoded stream.

The quantization matrix mode parameter may also, in some embodiments, indicate a mode wherein no matrix is transmitted, which may correspond to both of two levels of quality using default or otherwise predetermined quantization matrices.

The method may comprise combining at least the first level encoded stream and the second level encoded stream into a combined encoded stream; and transmitting the combined encoded stream to the decoder for use in reconstructing the input video together with a received base encoded stream. In some cases, the combined encoded stream may comprise the base encoded stream.

Some embodiments employ the use of a "dead zone" in the quantization step. Thus applying the quantization operation may comprise quantizing coefficients using a linear quantizer, wherein the linear quantizer uses a dead zone of variable size.

It may also be advantageous in some embodiments for the quantization operation to comprise using a quantization offset, which is typically a non-centred quantization (or de-quantization, for the inverse of this step) offset. Likewise, as is described further below, in the decoding process for the dequantization according to methods of this disclosure, in some embodiments every group of transform coefficients passed to the process belong to specific plane and layer, and have typically been scaled using a linear quantizer. The linear quantizer can thus use a non-centred dequantization offset.

Typically, the method comprises adapting the distribution used in the quantization step. In some embodiments this adapting of the distribution is predetermined, while alternatively or additionally the adapting may be selectively applied based on analysis of any one or more of: the input video, a downsampled video, a reconstructed video, and an upsampled video. In this way the overall performance of the encoder and decoder may be improved.

In some embodiments it may be preferable for the adapting of the quantization to be applied selectively. This may be based, for example on a predetermined set of rules. Additionally, or alternatively, it may be determinatively applied based on an analysis or feedback of performance, in particular decoding performance.

An encoder configured to carry out the method of any of the above aspects of implementations may also be provided.

According to a further aspect, there may be provided a method of decoding an encoded stream into a reconstructed output video, the method comprising: receiving a first base encoded stream; instructing a decoding operation on the first base encoded stream using a base decoder to generate a first output video; receiving a first level encoded stream; decoding the first level encoded stream to obtain a first set of residuals; and, combining the first set of residuals with the first output video to generate a reconstructed video, wherein decoding the first level encoded stream comprises: decoding a first set of quantized coefficients from the first level encoded stream; obtaining a first set of parameters indicating how to dequantize the first set of quantized coefficients; and dequantizing the first set of quantized coefficients using the first set of parameters, wherein different ones of the first set of quantized coefficients are dequantized using respective dequantization parameters.

Residuals are typically obtained by way of decoding a received stream. In particular, the obtaining the first set of parameters may comprise: obtaining a quantization mode parameter that is signalled with the first level encoded stream; responsive to a first value of the quantization mode parameter, using a default quantization matrix as the first set of parameters; responsive to other values of the quantization mode parameter, obtaining a quantization matrix that is signalled with the first level encoded stream and using quantization matrix as the first set of parameters.

Typically, decoding the first level encoded stream comprises: prior to dequantizing the first set of quantized coefficients, applying an entropy decoding operation to the first level encoded stream; and after dequantizing the first set of quantized coefficients, applying an inverse transform operation to generate the first set of residuals.

A method, according to the aforementioned aspect, of decoding a plurality of encoded streams into a reconstructed output video, may comprise: receiving a first base encoded stream; decoding the first base encoded stream according to a first codec to generate a first output video; receiving one or more further encoded streams; decoding the one or more further encoded streams to generate a set of residuals; and, combining the set of residuals with the first video to generate a decoded video.

In some embodiments, the method comprises retrieving a plurality of decoding parameters from a header. The decoding parameters may indicate which procedural steps were included in the encoding process.

As is described in more detail later in this disclosure, the use of two levels of encoded streams may be used advantageously in the encoding and decoding process. Some embodiments may accordingly further comprise: receiving a second level encoded stream; decoding the second level encoded stream to obtain a second set of residuals; and combining the second set of residuals with an upsampled version of the reconstructed video to generate a reconstruction of an original resolution input video, wherein decoding the second level encoded stream comprises: decoding a second set of quantized coefficients from the second level encoded stream; obtaining a second set of parameters indicating how to dequantize the second set of quantized coefficients; and dequantizing the second set of quantized coefficients using the second set of parameters, wherein different ones of the second set of quantized coefficients are dequantized using respective dequantization parameters.

The dequantization may involve the receipt of one or more quantization matrices from the encoder for example, and using the respective matrix in the dequantizing step to determine an appropriate quantization parameter for a block of an encoded video frame. Thus the obtaining the first and second set of parameters may, in some embodiments, comprise: obtaining a quantization matrix that is signalled with one or more of the first and second level encoded streams, and dequantizing comprises, for a plurality of quantized coefficient elements within a block of quantized coefficients for a frame of video, a block corresponding to a n by n grid of picture elements, a frame comprising multiple blocks that cover the spatial area associated with the frame: obtaining a quantization parameter from the quantization matrix based on a location of a given quantized coefficient element; and using the quantization parameter to dequantize the given quantized coefficient element. As alluded to above, dequantizing typically comprises using a linear dequantization operation and applying a non-centred de-quantization offset.

A decoder for decoding an encoded stream into a reconstructed output video and configured to perform the method of any one the above aspects or implementations may also be provided.

According to further aspects of the invention there may be provided a non-transitory computer-readable storage medium storing instructions that, when executed by a processor, cause the processor to perform any of the methods of the above aspects.

DETAILED DESCRIPTION

Figure 1:
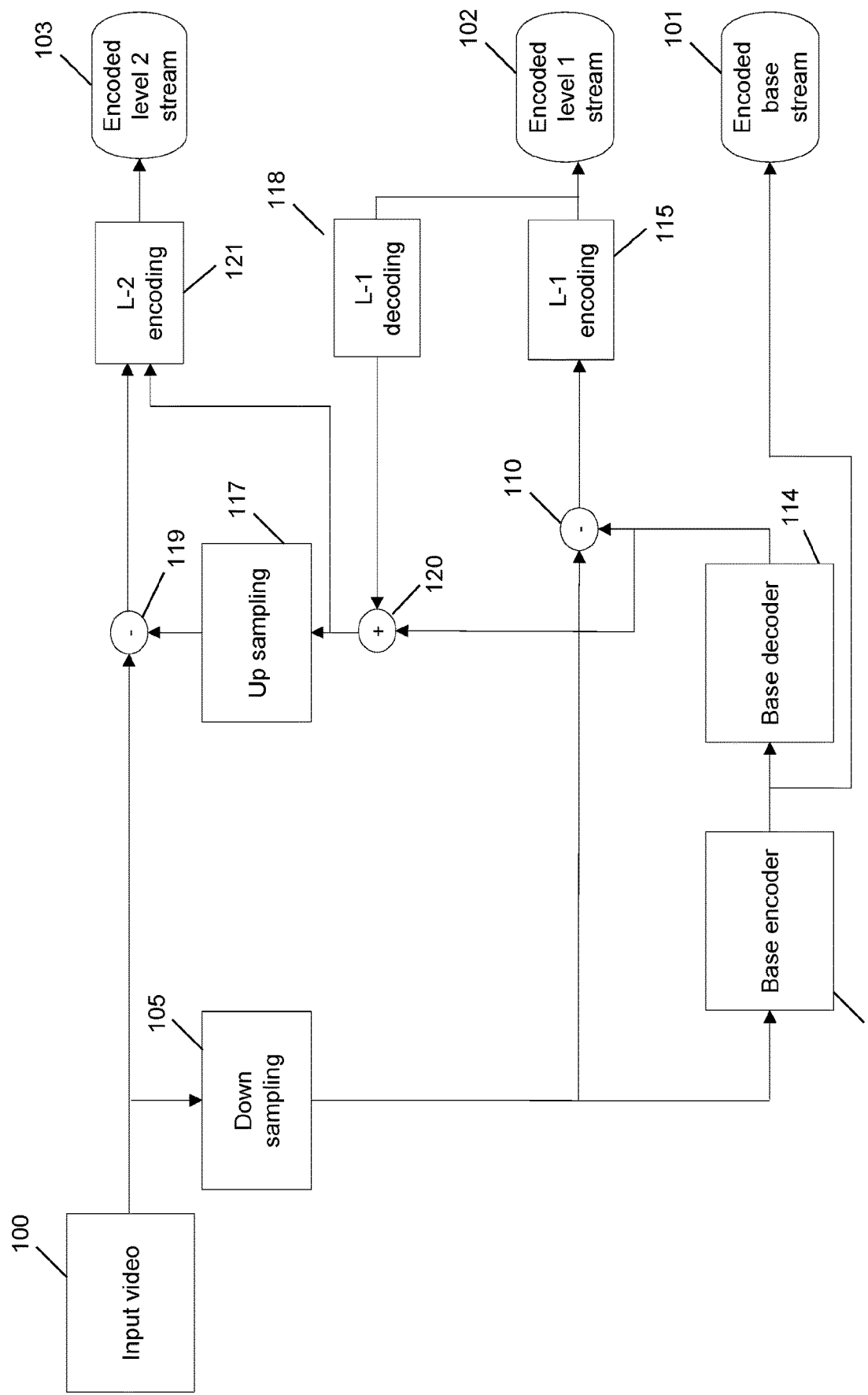
FIG. 1 shows a high-level schematic of an encoding process.

The present invention relates to methods. In particular, the present invention relates to methods for encoding and decoding signals. Processing data may include, but is not limited to, obtaining, deriving, outputting, receiving and reconstructing data.

The coding technology discussed herein is a flexible, adaptable, highly efficient and computationally inexpensive coding format which combines a video coding format, a base codec, (e.g. AVC, HEVC, or any other present or future codec) with an enhancement level of coded data, encoded using a different technique. The technology uses a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for a software implementation.

It is important that any optimisation used in the new coding technology is tailored to the specific requirements or constraints of the enhancement stream and is of low complexity. Such requirements or constraints include: the potential reduction in computational capability resulting from the need for software decoding of the enhancement stream; the need for combination of a decoded set of residuals with a decoded frame; the likely structure of the residual data, i.e. the relatively high proportion of zero values with highly variable data values over a large range; the nuances of a quantized block of coefficients; and, the structure of the enhancement stream being a set of discrete residual frames separated into various components. Note that the constraints placed on the enhancement stream mean that a simple and fast entropy coding operation is essential to enable the enhancement stream to effectively correct or enhance individual frames of the base decoded video. Note that in some scenarios the base stream is also being decoded substantially simultaneously before combination, putting a strain on resources.

In one case, the methods described herein may be applied to so-called planes of data that reflect different colour components of a video signal. For example, the methods described herein may be applied to different planes of YUV or RGB data reflecting different colour channels. Different colour channels may be processed in parallel. Hence, references to sets of residuals as described herein may comprise multiple sets of residuals, where each colour component has a different set of residuals that form part of a combined enhancement stream. The components of each stream may be collated in any logical order, for example, each plane at the same level may be grouped and sent together or, alternatively, the sets of residuals for different levels in each plane may be sent together.

This present document preferably fulfils the requirements of the following ISO/IEC documents: "Call for Proposals for Low Complexity Video Coding Enhancements" ISO/IEC JTC1/SC29/WG11 N17944, Macao, CN, October 2018 and "Requirements for Low Complexity Video Coding Enhancements" ISO/IEC JTC1/SC29/WG11 N18098, Macao, CN, October 2018 (which are incorporated by reference herein).

The general structure of the proposed encoding scheme in which the presently described techniques can be applied, uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream. This structure creates a plurality of degrees of freedom that allow great flexibility and adaptability to many situations, thus making the coding format suitable for many use cases including Over-The-Top (OTT) transmission, live streaming, live Ultra High Definition (UHD) broadcast, and so on. Although the decoded output of the base codec is not intended for viewing, it is a fully decoded video at a lower resolution, making the output compatible with existing decoders and, where considered suitable, also usable as a lower resolution output. In certain cases, a base codec may be used to create a base stream. The base codec may comprise an independent codec that is controlled in a modular or "black box" manner. The methods described herein may be implemented by way of computer program code that is executed by a processor and makes function calls upon hardware and/or software implemented base codecs.

In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame. It should be noted that this generalised example is agnostic as to the encoding operations performed and the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data. The signal may be an image or video. In these examples, the set of residuals corresponds to an image or frame of the video, with each residual being associated with a pixel of the signal, the pixel being the signal element. Examples disclosed herein describe how these residuals may be modified (i.e. processed) to impact the encoding pipeline or the eventually decoded image while reducing overall data size. Residuals or sets may be processed on a per residual element (or residual) basis, or processed on a group basis such as per tile or per coding unit where a tile or coding unit is a neighbouring subset of the set of residuals. In one case, a tile may comprise a group of smaller coding units. Note that the processing may be performed on each frame of a video or on only a set number of frames in a sequence.

In general, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 1. An input full resolution video 100 is processed to generate various encoded streams 101, 102, 103. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 1 may provide a general low complexity encoder. In certain cases, the enhancement streams may be generated by encoding processes that form part of the low complexity encoder and the low complexity encoder may be configured to control an independent base encoder and decoder (e.g. as packaged as a base codec). In other cases, the base encoder and decoder may be supplied as part of the low complexity encoder. In one case, the low complexity encoder of FIG. 1 may be seen as a form of wrapper for the base codec, where the functionality of the base codec may be hidden from an entity implementing the low complexity encoder.

A down-sampling operation illustrated by downsampling component 105 may be applied to the input video to produce a down-sampled video to be encoded by a base encoder 113 of a base codec. The down-sampling can be done either in both vertical and horizontal directions, or alternatively only in the horizontal direction. The base encoder 113 and a base decoder 114 may be implemented by a base codec (e.g. as different functions of a common codec). The base codec, and/or one or more of the base encoder 113 and the base decoder 114 may comprise suitably configured electronic circuitry (e.g. a hardware encoder/decoder) and/or computer program code that is executed by a processor.

Each enhancement stream encoding process may not necessarily include an up-sampling step. In FIG. 1 for example, the first enhancement stream is conceptually a correction stream while the second enhancement stream is up-sampled to provide a level of enhancement.

Looking at the process of generating the enhancement streams in more detail, to generate the encoded Level 1 stream, the encoded base stream is decoded by the base decoder 114 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 110 (i.e. a subtraction operation is applied to the down-sampled input video and the decoded base stream to generate a first set of residuals). The output of the comparator 110 may be referred to as a first set of residuals, e.g. a surface or frame of residual data, where a residual value is determined for each picture element at the resolution of the base encoder 113, the base decoder 114 and the output of the downsampling block 105.

The difference is then encoded by a first encoder 115 (i.e. a level 1 encoder) to generate the encoded Level 1 stream 102 (i.e. an encoding operation is applied to the first set of residuals to generate a first enhancement stream).

As noted above, the enhancement stream may comprise a first level of enhancement 102 and a second level of enhancement 103. The first level of enhancement 102 may be considered to be a corrected stream, e.g. a stream that provides a level of correction to the base encoded/decoded video signal at a lower resolution than the input video 100. The second level of enhancement 103 may be considered to be a further level of enhancement that converts the corrected stream to the original input video 100, e.g. that applies a level of enhancement or correction to a signal that is reconstructed from the corrected stream.

In the example of FIG. 1, the second level of enhancement 103 is created by encoding a further set of residuals. The further set of residuals are generated by a level 2 comparator 119. The level 2 comparator 119 determines a difference between an up-sampled version of a decoded level 1 stream, e.g. the output of an upsampling component 117, and the input video 100. The input to the upsampling component 117 is generated by applying a first decoder (i.e. a level 1 decoder) to the output of the first encoder 115. This generates a decoded set of level 1 residuals. These are then combined with the output of the base decoder 114 at summation component 120. This effectively applies the level 1 residuals to the output of the base decoder 114. It allows for losses in the level 1 encoding and decoding process to be corrected by the level 2 residuals. The output of summation component 120 may be seen as a simulated signal that represents an output of applying level 1 processing to the encoded base stream 101 and the encoded level 1 stream 102 at a decoder.

As noted, an up-sampled stream is compared to the input video which creates a further set of residuals (i.e. a difference operation is applied to the up-sampled re-created stream to generate a further set of residuals). The further set of residuals are then encoded by a second encoder 121 (i.e. a level 2 encoder) as the encoded level 2 enhancement stream (i.e. an encoding operation is then applied to the further set of residuals to generate an encoded further enhancement stream).

Thus, as illustrated in FIG. 1 and described above, the output of the encoding process is a base stream 101 and one or more enhancement streams 102, 103 which preferably comprise a first level of enhancement and a further level of enhancement. The three streams 101, 102 and 103 may be combined, with or without additional information such as control headers, to generate a combined stream for the video encoding framework that represents the input video 100. It should be noted that the components shown in FIG. 1 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g. either spatial dependencies or temporal dependencies). The dependencies of comparative video encoding schemes limit the level of parallelism and require a much higher complexity.

Figure 2:
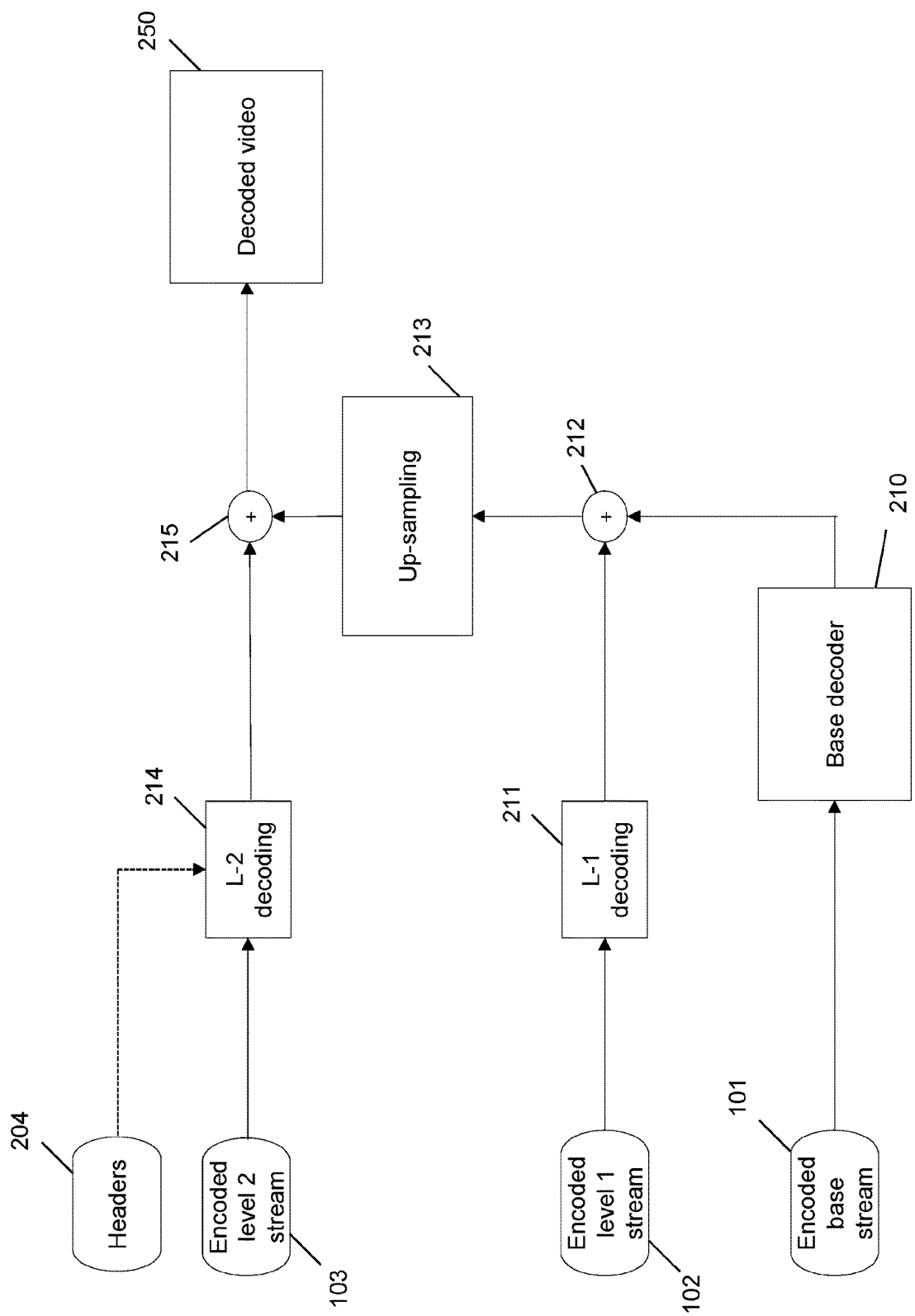
FIG. 2 shows a high-level schematic of a decoding process.

A corresponding generalised decoding process is depicted in the block diagram of FIG. 2. FIG. 2 may be said to show a low complexity decoder that corresponds to the low complexity encoder of FIG. 1. The low complexity decoder receives the three streams 101, 102, 103 generated by the low complexity encoder together with headers 204 containing further decoding information. The encoded base stream 101 is decoded by a base decoder 210 corresponding to the base codec used in the low complexity encoder. The encoded level 1 stream 102 is received by a first decoder 211 (i.e. a level 1 decoder), which decodes a first set of residuals as encoded by the first encoder 115 of FIG. 1. At a first summation component 212, the output of the base decoder 210 is combined with the decoded residuals obtained from the first decoder 211. The combined video, which may be said to be a level 1 reconstructed video signal, is upsampled by upsampling component 213. The encoded level 2 stream 103 is received by a second decoder 214 (i.e. a level 2 decoder). The second decoder 214 decodes a second set of residuals as encoded by the second encoder 121 of FIG. 1. Although the headers 204 are shown in FIG. 2 as being used by the second decoder 214, they may also be used by the first decoder 211 as well as the base decoder 210. The output of the second decoder 214 is a second set of decoded residuals. These may be at a higher resolution to the first set of residuals and the input to the upsampling component 213. At a second summation component 215, the second set of residuals from the second decoder 214 are combined with the output of the upsampling component 213, i.e. an upsampled reconstructed level 1 signal, to reconstruct decoded video 250.

As per the low complexity encoder, the low complexity decoder of FIG. 2 may operate in parallel on different blocks or coding units of a given frame of the video signal. Additionally, decoding by two or more of the base decoder 210, the first decoder 211 and the second decoder 214 may be performed in parallel. This is possible as there are no inter-block dependencies.

In the decoding process, the decoder may parse the headers 204 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 250. The decoded video 250 may be a lossy or lossless reconstruction of the original input video 100 depending on the configuration of the low complexity encoder and decoder. In many cases, the decoded video 250 may be a lossy reconstruction of the original input video 100 where the losses have a reduced or minimal effect on the perception of the decoded video 250.

In each of FIGS. 1 and 2, the level 2 and level 1 encoding operations may include the steps of transformation, quantization and entropy encoding (e.g. in that order). Similarly, at the decoding stage, the residuals may be passed through an entropy decoder, a de-quantizer and an inverse transform module (e.g. in that order). Any suitable encoding and corresponding decoding operation may be used. Preferably however, the level 2 and level 1 encoding steps may be performed in software (e.g. as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components: average, vertical, horizontal and diagonal. As alluded to earlier in this disclosure, these components that are output by the transform may be taken in such embodiments as the coefficients to be quantized in accordance with the described methods.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

The video compression residual data for the full-sized video frame may be referred to as LoQ-2 (e.g. 1920×1080 for an HD video frame or higher for a UHD frame), while that of the decimated frame may be referred to as LoQ-x, where x denotes a number corresponding to a hierarchical decimation. In the described examples of FIGS. 1 and 2, the variable x may have values of 1 and 2 represent the first and second enhancement streams. Hence there are 2 hierarchical levels for which compression residuals will be generated. Other naming schemes for the levels may also be applied without any change in functionality (e.g. the level 1 and level 2 enhancement streams described herein may alternatively be referred to as level 1 and level 2 streams—representing a count down from the highest resolution).

Figure 3:
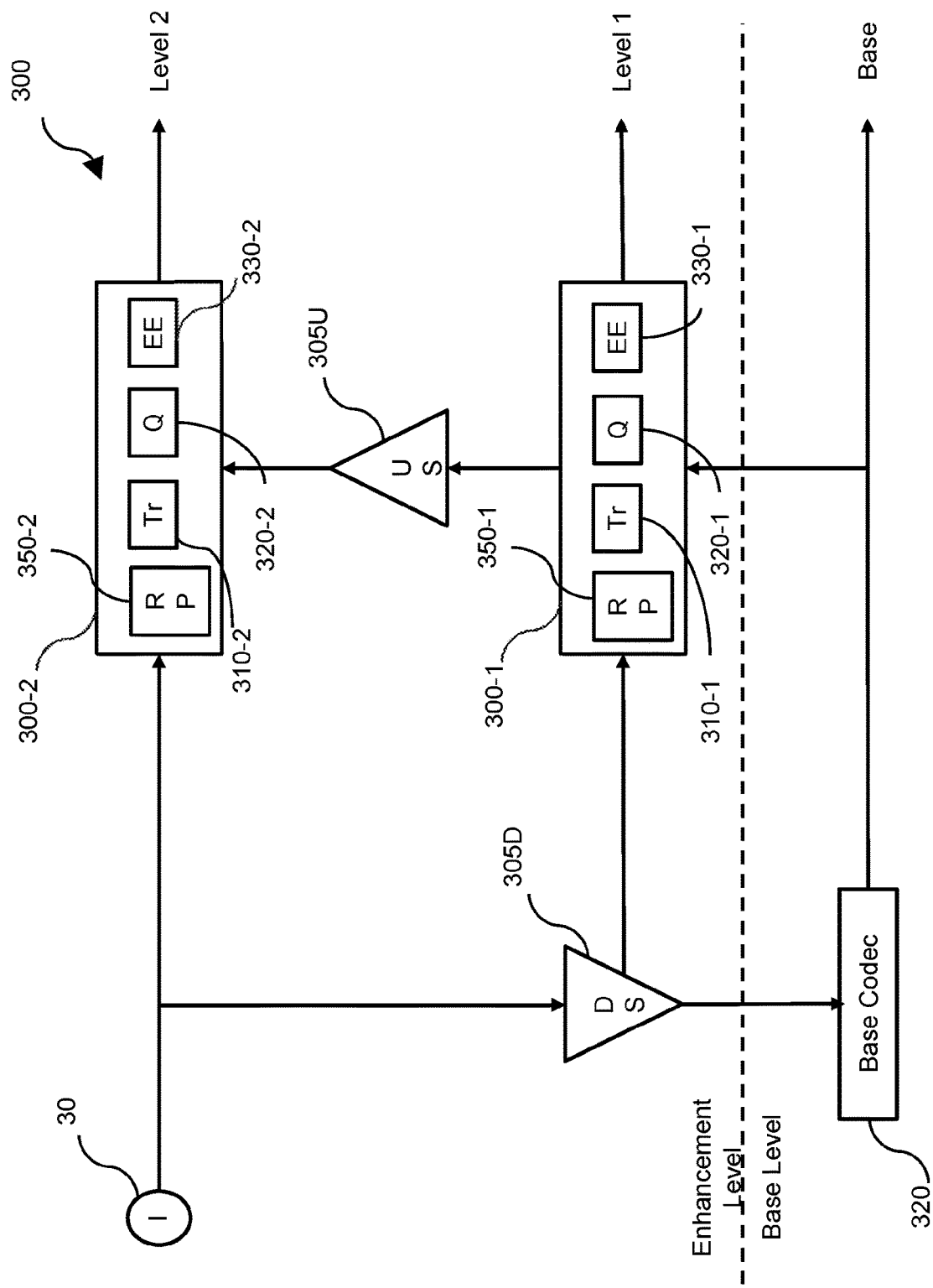
FIG. 3 shows a high-level schematic of an encoding process and specific encoding steps.

A more detailed encoding process is depicted in the block diagram of FIG. 3. The encoding process is split into two halves as shown by the dashed line. Below the dashed line is the base level of an encoder 300, which may usefully be implemented in hardware or software. Above the dashed line is the enhancement level, which may usefully be implemented in software. The encoder 300 may comprise only the enhancement level processes, or a combination of the base level processes and enhancement level processes as needed. The encoder 300 may usefully be implemented in software, especially at the enhancement level. This arrangement allows, for example, a legacy hardware encoder that provides the base level to be upgraded using a firmware (e.g. software) update, where the firmware is configured to provide the enhancement level. In newer devices, both the base level and the enhancement level may be provided in hardware and/or a combination of hardware and software.

The encoder topology at a general level is as follows. The encoder 300 comprises an input I for receiving an input signal 30. The input signal 30 may comprise an input video signal, where the encoder is applied on a frame-by-frame basis. The input I is connected to a down-sampler 305D and processing block 300-2. The down-sampler 305D may correspond to the downsampling component 105 of FIG. 1 and the processing block 300-2 may correspond to the second encoder 121 of FIG. 1, The down-sampler 305D outputs to a base codec 320 at the base level of the encoder 300. The base codec 320 may implement the base encoder 113 and the base decoder 114 of FIG. 1. The down-sampler 305D also outputs to processing block 300-1. The processing block 300-1 may correspond to the first encoder 115 of FIG. 1. Processing block 300-1 passes an output to an up-sampler 305U, which in turn outputs to the processing block 300-2. The upsampler 305U may correspond to the upsampling component 117 of FIG. 1. Each of the processing blocks 300-2 and 300-1 comprise one or more of the following modules: a transform block 310, a quantization block 320, an entropy encoding block 330 and a residual processing block 350. The residual block 350 may occur prior to the transform block 310 and/or control residual processing in the processing blocks 300. The order of processing may be as set out in the Figures.

The input signal 30, such as in this example a full (or highest) resolution video, is processed by the encoder 300 to generate various encoded streams. A base encoded stream is produced by feeding the base codec 320 (e.g., AVC, HEVC, or any other codec) at the base level with a down-sampled version of the input video 30, using the down-sampler 305D. The base encoded stream may comprise the output of a base encoder of the base codec 320. A first encoded stream (an encoded level 1 stream) is created by reconstructing the encoded base stream to create a base reconstruction, and then taking the difference between the base reconstruction and the down-sampled version of the input video 30. Reconstructing the encoded base stream may comprise receiving a decoded base stream from the base codec (i.e. the input to processing block 300-1 comprises a base decoded stream as shown in FIG. 1). The difference signal is then processed at block 300-1 to create the encoded level 1 stream. Block 300-1 comprises a transform block 310-1, a quantization block 320-1 and an entropy encoding block 330-1. A second encoded stream (an encoded level 2 stream) is created by up-sampling a corrected version of the base reconstruction, using the up-sampler 305U, and taking the difference between the corrected version of the base reconstruction and the input signal 30. This difference signal is then processed at block 300-2 to create the encoded level 2 stream. Block 300-2 comprises a transform block 310-2, a quantization block 320-2, an entropy encoding block 330-2 and a residual processing block 350-2. As per processing block 300-1, the blocks may be performed in the order shown in the Figures (e.g. residual processing followed by transformation followed by quantization followed by entropy encoding).

A quantization scheme may be useful to create the residual signals into quanta, so that certain variables can assume only certain discrete magnitudes. In one case quantizing comprises actioning a division by a pre-determined step-width. This may be applied at both levels (1 and 2). For example, quantizing at block 320 may comprise dividing transformed residual values by a step-width (e.g. where an integer quotient is used to generate the quantized value and a remainder is ignored). The step-width may be pre-determined, e.g. selected based on a desired level of quantization. In one case, division by a step-width may be converted to a multiplication by an inverse step-width, which may be more efficiently implemented in hardware. In this case, dequantizing, such as at block 320, may comprise multiplying by the step-width. Entropy encoding as described herein may comprise run length encoding (RLE), then processing the encoded output is processed using a Huffman encoder. In certain cases, only one of these schemes may be used when entropy encoding is desirable.

The encoded base stream may be referred to as the base level stream.

As described earlier, residuals are computed by comparing an original form of an image signal with a reconstructed form of an image signal. For example, in one case, residuals for an L-2 enhancement stream are determined by subtracting an output of the upsampling from an original form of an image signal (e.g. the input video as indicated in the Figures). The input to the upsampling may be said to be a reconstruction of a signal following a simulated decoding. In another case, residuals for an L-1 enhancement stream are determined by subtracting an image stream output by the base decoder from a downsampled form of the original image signal (e.g. the output of the downsampling).

Figure 4:
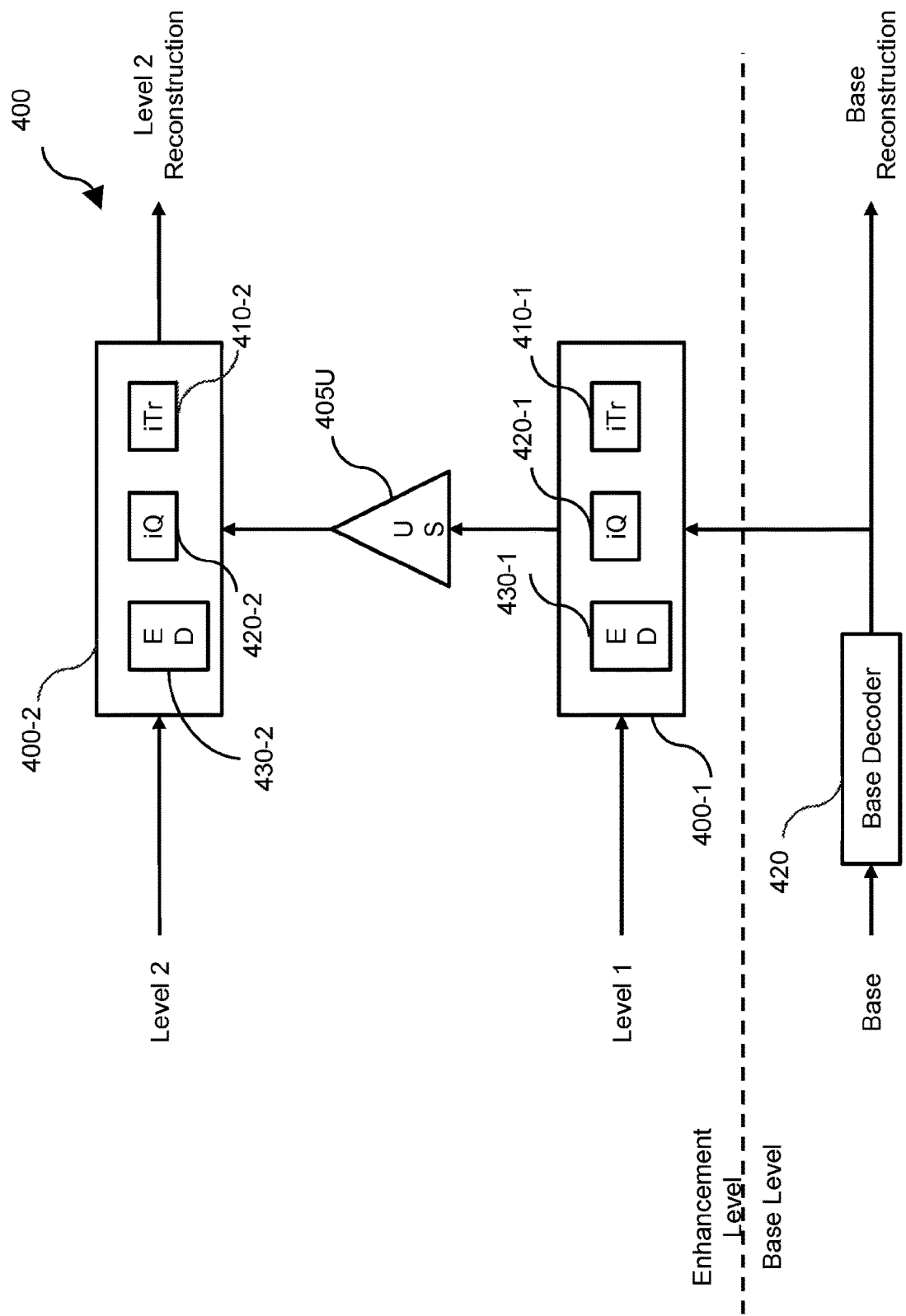
FIG. 4 shows a high-level schematic of a decoding process and specific decoding steps.

A decoder 400 that performs a decoding process corresponding to the encoder of FIG. 3 is depicted in the block diagram of FIG. 4. The decoding process is split into two halves as shown by the dashed line. Below the dashed line is the base level of the decoder 400, which may usefully be implemented in hardware. Above the dashed line is the enhancement level, which may usefully be implemented in software. The decoder 400 may comprise only the enhancement level processes, or a combination of the base level processes and enhancement level processes as needed. The decoder 400 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals. In other cases, the base level may comprise any existing and/or future video encoding tool or technology.

The decoder topology at a general level is as follows. The decoder 400 comprises an input (not shown) for receiving one or more input signals comprising the encoded base stream, the encoded level 1 stream, and the encoded level 2 stream together with optional headers containing further decoding information. The decoder 400 comprises a base decoder 420 at the base level, and processing blocks 400-1 and 400-2 at the enhancement level. An up-sampler 405U is also provided between the processing blocks 400-1 and 400-2 to provide processing block 400-2 with an up-sampled version of a signal output by processing block 400-1. The base decoder 420 may correspond to the base decoder 210 of FIG. 2, the processing block 400-1 may correspond to the first decoder 211 of FIG. 2, the processing block 400-2 may correspond to the second decoder 214 of FIG. 2 and the upsampler 405U may correspond to the upsampler 213 of FIG. 2.

The decoder 400 receives the one or more input signals and directs the three streams generated by the encoder 300. The encoded base stream is directed to and decoded by the base decoder 420, which corresponds to the base codec 420 used in the encoder 300, and which acts to reverse the encoding process at the base level. The encoded level 1 stream is processed by block 400-1 of decoder 400 to recreate the first set of residuals created by encoder 300. Block 400-1 corresponds to the processing block 300-1 in encoder 300, and at a basic level acts to reverse or substantially reverse the processing of block 300-1. The output of the base decoder 420 is combined with the first set of residuals obtained from the encoded level 1 stream. The combined signal is up-sampled by up-sampler 405U. The encoded level 2 stream is processed by block 400-2 to recreate the further residuals created by the encoder 300. Block 400-2 corresponds to the processing block 300-2 of the encoder 300, and at a basic level acts to reverse or substantially reverse the processing of block 300-2. The up-sampled signal from up-sampler 405U is combined with the further residuals obtained from the encoded level 2 stream to create a level 2 reconstruction of the input signal 30. The output of the processing block 400-2 may be seen as decoded video similar to the decoded video 250 of FIG. 2.

As noted above, the enhancement stream may comprise two streams, namely the encoded level 1 stream (a first level of enhancement) and the encoded level 2 stream (a second level of enhancement). The encoded level 1 stream provides a set of correction data which can be combined with a decoded version of the base stream to generate a corrected picture.

Figure 5:
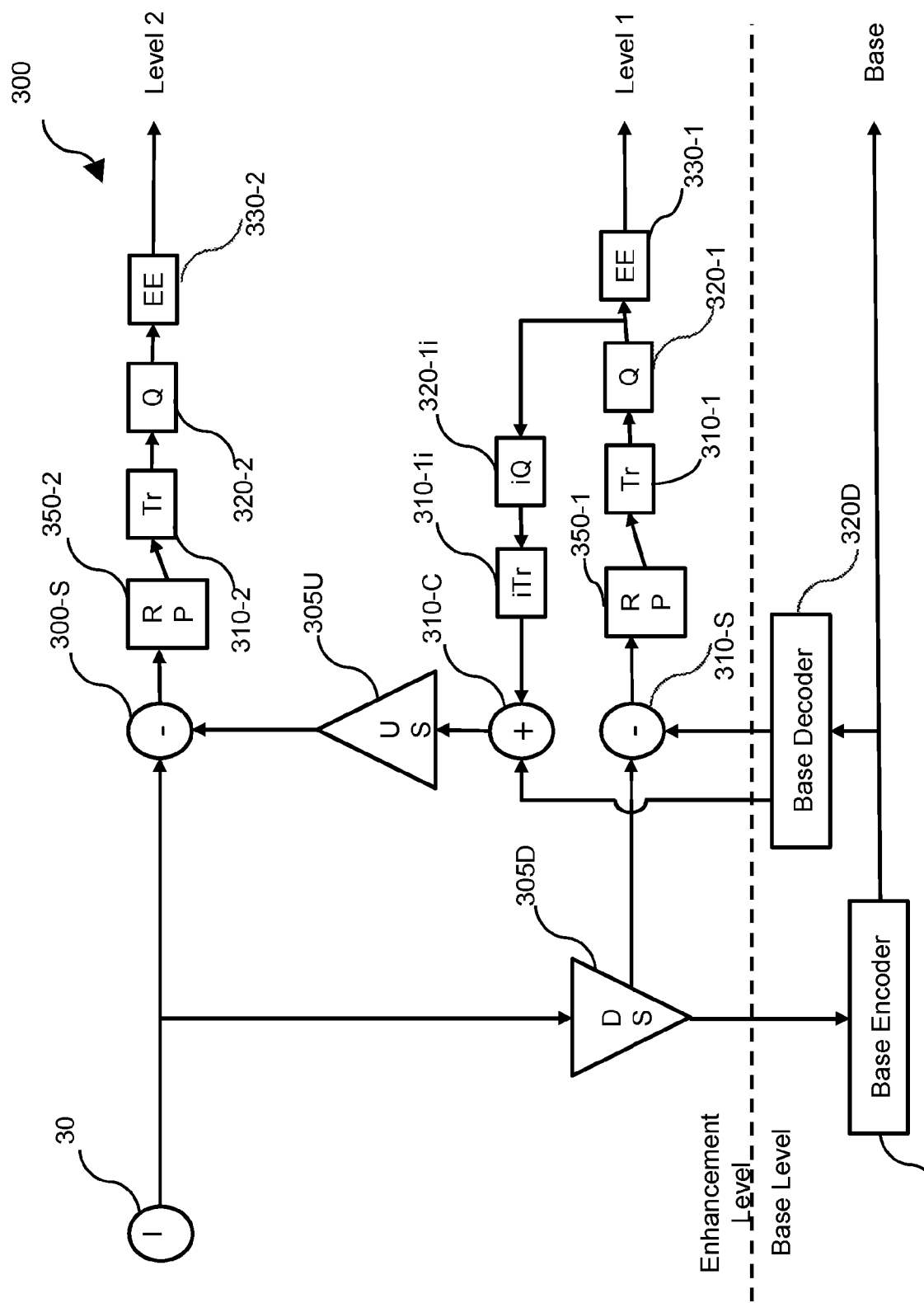
FIG. 5 shows a high-level schematic of an encoding process.

FIG. 5 shows the encoder 300 of FIG. 1 in more detail. The encoded base stream is created directly by the base encoder 320E, and may be quantized and entropy encoded as necessary. In certain cases, these latter processes may be performed as part of the encoding by the base encoder 320E. To generate the encoded level 1 stream, the encoded base stream is decoded at the encoder 300 (i.e. a decoding operation is applied at base decoding block 320D to the encoded base stream). The base decoding block 320D is shown as part of the base level of the encoder 300 and is shown separate from the corresponding base encoding block 320E. For example, the base decoder 320D may be a decoding component that complements an encoding component in the form of the base encoder 320E with a base codec. In other examples, the base decoding block 320D may instead be part of the enhancement level and in particular may be part of processing block 300-1.

Returning to FIG. 5, a difference between the decoded base stream output from the base decoding block 320D and the down-sampled input video is created (i.e. a subtraction operation 310-S is applied to the down-sampled input video and the decoded base stream to generate a first set of residuals). Here the term residuals is used in the same manner as that known in the art; that is, residuals represent the error or differences between a reference signal or frame and a desired signal or frame. Here the reference signal or frame is the decoded base stream and the desired signal or frame is the down-sampled input video. Thus the residuals used in the first enhancement level can be considered as a correction signal as they are able to 'correct' a future decoded base stream to be the or a closer approximation of the down-sampled input video that was used in the base encoding operation. This is useful as this can correct for quirks or other peculiarities of the base codec. These include, amongst others, motion compensation algorithms applied by the base codec, quantization and entropy encoding applied by the base codec, and block adjustments applied by the base codec.

The components of block 300-1 in FIG. 3 are shown in more detail in FIG. 5. In particular, the first set of residuals are transformed, quantized and entropy encoded to produce the encoded level 1 stream. In FIG. 5, a transform operation 310-1 is applied to the first set of residuals; a quantization operation 320-1 is applied to the transformed set of residuals to generate a set of quantized residuals; and, an entropy encoding operation 330-1 is applied to the quantized set of residuals to generate the encoded level 1 stream at the first level of enhancement. However, it should be noted that in other examples only the quantization step 320-1 may be performed, or only the transform step 310-1. Entropy encoding may not be used, or may optionally be used in addition to one or both of the transform step 110-1 and quantization step 320-1. The entropy encoding operation can be any suitable type of entropy encoding, such as a Huffman encoding operation or a run-length encoding (RLE) operation, or a combination of both a Huffman encoding operation and a RLE operation.

The selection of entropy coding schemes such as these may, in combination with the described quantization, have an advantageous effect upon the coding performance. This may be understood in view of the tendency for the application of a high degree of quantization to residual data as described in this disclosure to result in a high proportion of zero values. Run length encoding as mentioned above is particularly suited to the encoding of data having such a distribution, and thus these approaches can synergistically improve the efficiency of the overall process. Likewise, for embodiments wherein quantization is applied with greater step-width values, and the distribution of quantized data is such that a plurality of integer values are present in relatively greater numbers, the efficiency of the encoding process would typically benefit from the use of prefix/Huffman encoding, which is particularly suited to such distributions. This is especially the case given the distributions of residuals wherein higher integer values have lower frequencies. These forms of distributions may be efficiently encoded with Huffman encoding, which works by allotting fewer bits to high-frequency symbols. In this way, the quantization and the entropy encoding operation are complementary.

As noted above, the enhancement stream may comprise the encoded level 1 stream (the first level of enhancement) and the encoded level 2 stream (the second level of enhancement). The first level of enhancement may be considered to enable a corrected video at a base level, that is, for example to correct for encoder and/or decoder artefacts. The second level of enhancement may be considered to be a further level of enhancement that is usable to convert the corrected video to the original input video or a close approximation thereto (e.g. to add detail or sharpness). For example, the second level of enhancement may add fine detail that is lost during the downsampling and/or help correct from errors that are introduced by one or more of the transform operation 310-1 and the quantization operation 320-1.

Referring to FIG. 3 and FIG. 5, to generate the encoded level 2 stream, a further level of enhancement information is created by producing and encoding a further set of residuals at block 300-2. The further set of residuals are the difference between an up-sampled version (via up-sampler 305U) of a corrected version of the decoded base stream (the reference signal or frame), and the input signal 30 (the desired signal or frame).

To achieve a reconstruction of the corrected version of the decoded base stream as would be generated at the decoder 400, at least some of the processing steps of block 300-1 are reversed to mimic the processes of the decoder 200, and to account for at least some losses and quirks of the transform and quantization processes. To this end, block 300-1 comprises an inverse quantize block 320-1i and an inverse transform block 310-1i. The quantized first set of residuals are inversely quantized at inverse quantize block 320-1i and are inversely transformed at inverse transform block 310-1i in the encoder 100 to regenerate a decoder-side version of the first set of residuals.

The decoded base stream from decoder 320D is combined with this improved decoder-side version of the first set of residuals (i.e. a summing operation 310-C is performed on the decoded base stream and the decoder-side version of the first set of residuals). Summing operation 310-C generates a reconstruction of the down-sampled version of the input video as would be generated in all likelihood at the decoder—i.e. a reconstructed base codec video). As illustrated in FIG. 3 and FIG. 5, the reconstructed base codec video is then up-sampled by up-sampler 305U.

The up-sampled signal (i.e. reference signal or frame) is then compared to the input signal 30 (i.e. desired signal or frame) to create a second set of residuals (i.e. a difference operation 300-S is applied to the up-sampled re-created stream to generate a further set of residuals). The second set of residuals are then processed at block 300-2 to become the encoded level 2 stream (i.e. an encoding operation is then applied to the further or second set of residuals to generate the encoded further or second enhancement stream).

In particular, the second set of residuals are transformed (i.e. a transform operation 310-2 is performed on the further set of residuals to generate a further transformed set of residuals). The transformed residuals are then quantized and entropy encoded in the manner described above in relation to the first set of residuals (i.e. a quantization operation 320-2 is applied to the transformed set of residuals to generate a further set of quantized residuals; and, an entropy encoding operation 320-2 is applied to the quantized further set of residuals to generate the encoded level 2 stream containing the further level of enhancement information). However, only the quantization step 20-1 may be performed, or only the transform and quantization step. Entropy encoding may optionally be used in addition. Preferably, the entropy encoding operation may be a Huffman encoding operation or a run-length encoding (RLE) operation, or both.

Thus, as illustrated in FIGS. 3 and 5 and described above, the output of the encoding process is a base stream at a base level, and one or more enhancement streams at an enhancement level which preferably comprises a first level of enhancement and a further level of enhancement. As discussed with reference to previous examples, the operations of FIG. 5 may be applied in parallel to coding units or blocks of a colour component of a frame as there are no inter-block dependencies. The encoding of each colour component within a set of colour components may also be performed in parallel (e.g. such that the operations of FIG. 5 are duplicated according to (number of frames)*(number of colour components)*(number of coding units per frame)). It should also be noted that different colour components may have a different number of coding units per frame, e.g. a luma (e.g. Y) component may be processed at a higher resolution than a set of chroma (e.g. U or V) components as human vision may detect lightness changes more than colour changes.

Figure 6:
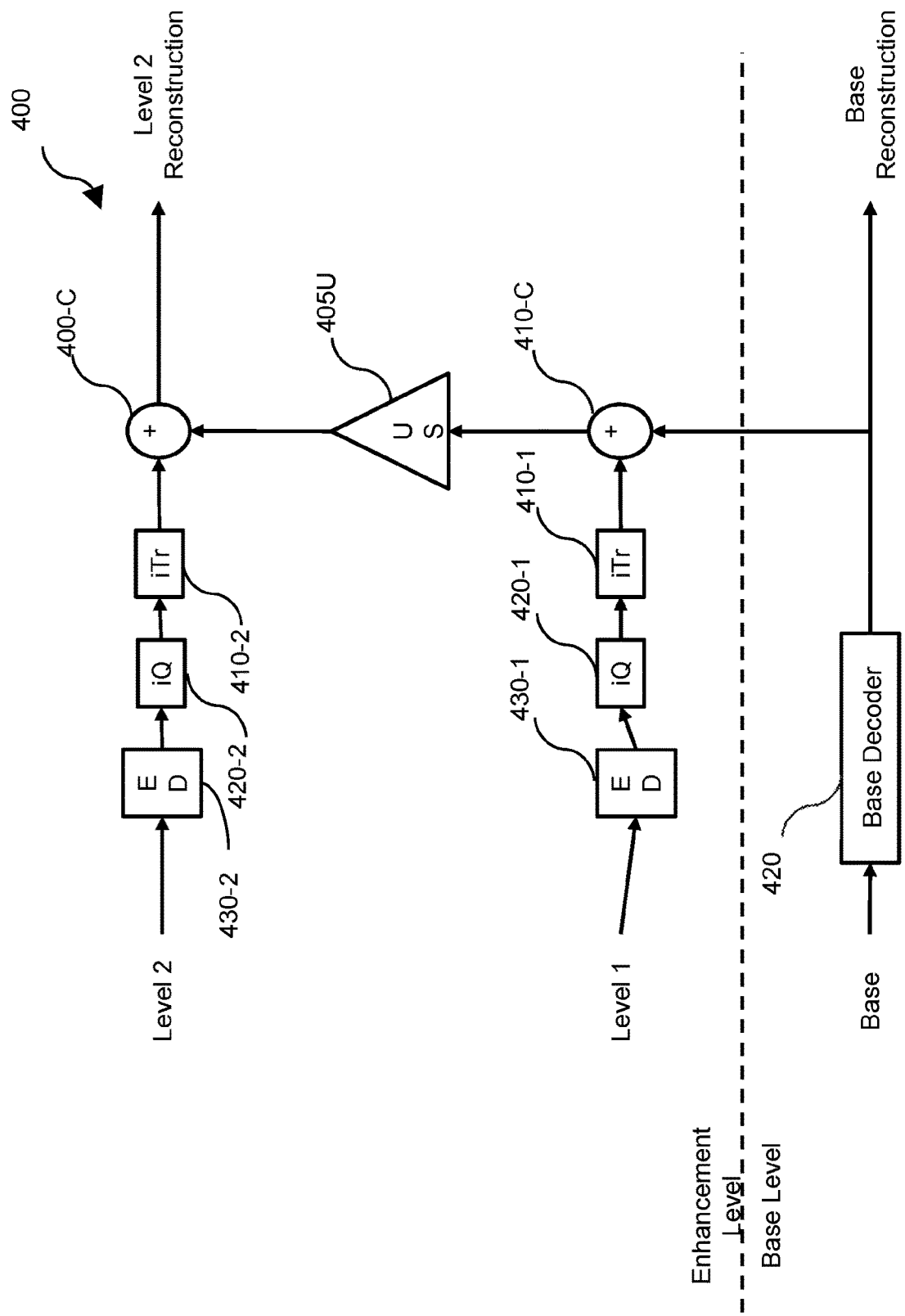
FIG. 6 shows a high-level schematic of a further decoding process.

The encoded base stream and one or more enhancement streams are received at the decoder 400. FIG. 6 shows the decoder of FIG. 4 in more detail.

The encoded base stream is decoded at base decoder 420 in order to produce a base reconstruction of the input signal 30 received at encoder 300. This base reconstruction may be used in practice to provide a viewable rendition of the signal 30 at the lower quality level. However, the primary purpose of this base reconstruction signal is to provide a base for a higher quality rendition of the input signal 30. To this end, the decoded base stream is provided to processing block 400-1. Processing block 400-1 also receives encoded level 1 stream and reverses any encoding, quantization and transforming that has been applied by the encoder 300. Block 400-1 comprises an entropy decoding process 430-1, an inverse quantization process 420-1, and an inverse transform process 410-1. Optionally, only one or more of these steps may be performed depending on the operations carried out at corresponding block 300-1 at the encoder. By performing these corresponding steps, a decoded level 1 stream comprising the first set of residuals is made available at the decoder 400.

The first set of residuals is combined with the decoded base stream from base decoder 420 (i.e. a summing operation 410-C is performed on a decoded base stream and the decoded first set of residuals to generate a reconstruction of the down-sampled version of the input video—i.e. the reconstructed base codec video). As illustrated in FIG. 4 and FIG. 6, the reconstructed base codec video is then up-sampled by up-sampler 405U.

Additionally, and optionally in parallel, the encoded level 2 stream is processed at block 400-2 of FIG. 2 in order to produce a decoded further set of residuals. Similar to processing block 300-2, processing block 400-2 comprises an entropy decoding process 430-2, an inverse quantization process 420-2 and an inverse transform process 410-2. Of course, these operations will correspond to those performed at block 300-2 in encoder 300, and one or more of these steps may be omitted as necessary. Block 400-2 produces a decoded level 2 stream comprising the further set of residuals and these are summed at operation 400-C with the output from the up-sampler 405U in order to create a level 2 reconstruction of the input signal 30. The level 2 reconstruction may be viewed as an output decoded video such as 250 in FIG. 2. In certain examples, it may also be possible to obtain and view the reconstructed video that is passed to the upsampler 405U—this will have a first level of enhancement but may be at a lower resolution than the level 2 reconstruction.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where downsampling reduces the dimensionality in each direction by 2). In this case, when traffic occurs the display device may revert to displaying the base reconstruction while the level 2 stream is disrupted (e.g. while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 220 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder.

In certain examples, residuals may be considered to be errors or differences at a particular level of quality or resolution. In described examples, there are two levels of quality or resolutions and thus two sets of residuals (L-1 and L-2). Each set of residuals described herein models a different form of error or difference. The L-1 residuals, for example, typically correct for the characteristics of the base encoder, e.g. correct artefacts that are introduced by the base encoder as part of the encoding process. In contrast, the L-2 residuals, for example, typically correct complex effects introduced by the shifting in the levels of quality and differences introduced by the L-1 correction (e.g. artefacts generated over a wider spatial scale, such as areas of 4 or 16 pixels, by the L-1 encoding pipeline). This means it is not obvious that operations performed on one set of residuals will necessarily provide the same effect for another set of residuals, e.g. each set of residuals may have different statistical patterns and sets of correlations.

In the examples described herein residuals are encoded by an encoding pipeline. This may include transformation, quantization and entropy encoding operations. It may also include residual ranking, weighting and filtering. These pipelines are shown in FIGS. 1 and 3A and 3B. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g. high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g. symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g. in space and/or in time). They have characteristics that differ from the characteristics of the image data they are derived from (e.g. pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g. transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g. 2×2 or 4×4 kernels—the Directional Decomposition and the Directional Decomposition Squared—as presented herein). The transform described herein may be applied using a Hadamard matrix (e.g. a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated coefficients (e.g. in space) that may be efficiently compressed. While correlations between coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Figure 7:
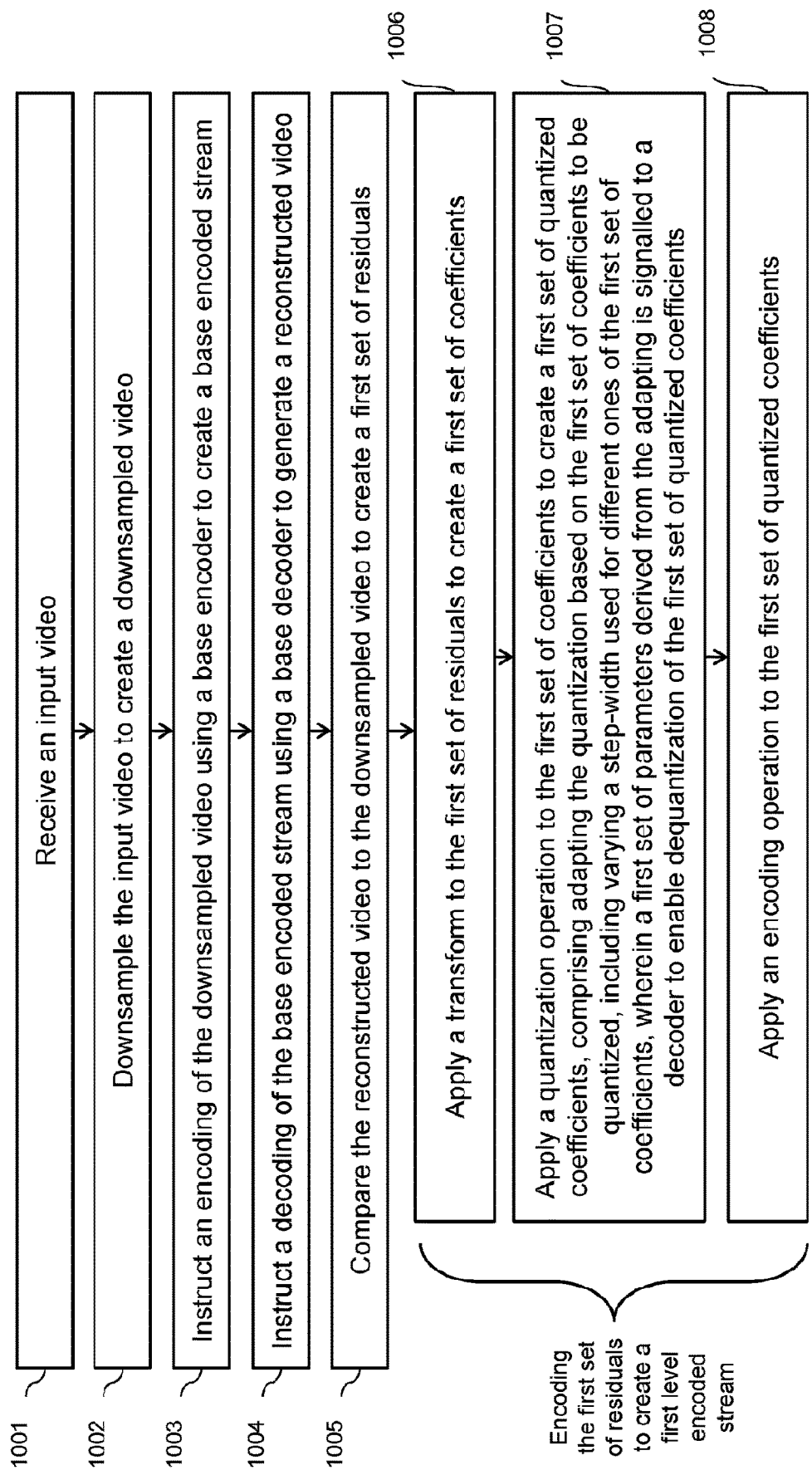
FIG. 7 shows a flowchart of concepts described herein.

For completeness, FIG. 7 illustrates a broad principle of the concept described herein in the form of a flowchart. The method 1000 includes: receiving an input video (step 1001); downsampling the input video to create a downsampled video (step 1002); instructing an encoding of the downsampled video using a base encoder to create a base encoded stream (step 1003); instructing a decoding of the base encoded stream using a base decoder to generate a reconstructed video (step 1004); comparing the reconstructed video to the downsampled video to create a first set of residuals (step 1005); and, encoding the first set of residuals to create a first level encoded stream, including: applying a transform to the first set of residuals to create a first set of coefficients (step 1006); applying a quantization operation to the first set of coefficients to create a first set of quantized coefficients (step 1007); and applying an encoding operation to the first set of quantized coefficients (step 1008), wherein applying the quantization operation comprises: adapting the quantization based on the first set of coefficients to be quantized, including varying a step-width used for different ones of the first set of coefficients, wherein a first set of parameters derived from the adapting is signalled to a decoder to enable dequantization of the first set of quantized coefficients.

By way of a specific example, quantization of residuals and/or coefficients (transformed residuals) may be performed based on bins having a defined step width. In this example a number of bins are defined with a stepwidth value of 5. The stepwidth may be understood as the quantization step size. The size of the stepwidth may be selectable, e.g. based on a parameter value. In certain cases, the size of the stepwidth may be set dynamically, e.g. based on the rate control examples described above. Returning to the specific example, the aforementioned stepwidth would result in bins corresponding to residual values in the ranges of 0-4, 5-9, 10-14, 15-19 (i.e. 0 to 4 including both 0 and 4). Bin widths may be configured to include or exclude end points as required. In this notional quantization example, the quantization is performed by replacing all values that fall into the bin with an integer value (e.g. residual values of between 0 and 4 inclusive have a quantized value of 1).

Quantization may be performed by dividing by the stepwidth (e.g. 5 in the specific example given above), taking the floor of the result (i.e. the nearest integer less than a decimal for positive values) and then adding one (e.g. 3/5=0.6, floor(0.6)=0, 0+1=1; or 16/5=3.2, floor(3.2)=3, 3+1=4). Negative values may be treated in a similar way, e.g. by working on absolute values then converting to negative values following calculation (e.g. abs(−9)=9, 9/5=1.8, floor (1.8)=1, 1+1=2, 2*-1=−2). In a specific a case of linear quantization, all bins may have a common stepwidth. It should be noted that various different implementations based on this approach may be enacted, for example, a first bin may have a quantized value of 0 instead of 1, or may comprise values from 1 to 5 inclusive. The above-described example is provided merely for the purpose of illustrating these principles with a given stepwidth.

In another specific example, a so-called "deadzone" (DZ) may be implemented. This may be understood in general as a region around the zero output value of a quantizer, that is a band containing a zero signal and having a size that may be the same as or different from the stepwidth. Thus, for this band of inputs that are close to zero, the signal may effectively be attenuated so that low-level signals, which may typically correspond to noise in visual data, are not allocated data unnecessarily. In this example, residuals or coefficients with a value within a pre-defined range are set to 0. The pre-defined range is a range around a value of 0. Values that are less than 6 and greater than −6 are set to 0. The deadzone may be set as a fixed range (e.g. −6 to 6) or may be set based on the stepwidth. In one case, the deadzone may be set as a predefined multiple of the stepwidth, e.g. as a linear function of a stepwidth value. In the example of FIG. 8B the deadzone is set as 2.4*stepwidth. Hence, with a stepwidth of 5, the deadzone extends from −6 to +6. In other case, the deadzone may be set as a non-linear function of a stepwidth value.

Having a deadzone may help reduce an amount of data to be transmitted over a network, e.g. help reduce a bit rate. When using a deadzone, residual or coefficient values that fall into the deadzone are effectively ignored. This approach may also help remove low levels of residual noise. Having an adaptive, rather than constant, deadzone means that smaller residual or coefficient values are not overly filtered when the stepwidth decreases (e.g. if more bandwidth is available) and that a bit rate is suitably reduce if the stepwidth is increased. The deadzone need only be enacted at the encoder, the decoder simply receives a quantized value of 0 for any residual or coefficient that falls within the deadzone.

A quantization offset may be used in certain cases. A quantization offset may be used to shift locations of quantization bins. In an example, many coefficient values may, for instance, be near zero, with the count of higher values decreasing with increasing distance from 0

A histogram may be used to model quantization. For ease of explanation, in a specific example, count values for first to third bins following a deadzone (for both positive and negative values) may represent a distribution. For example, counts for quantized values of 1, 2, 3 and −1, −2, −3 may represent this. Owing to the quantization, the distribution modelled by the histogram may differ from the actual distribution. For example, an error—e—may be obtained, representative of how the bar differs from the line.

To vary the properties of the error, e, a quantization offset—qO—may be applied. A quantization offset may be understood as a parameter the value of which defines whether and by what degree quantization intervals or bins are to be shifted from a predetermined or default location or set of values. For positive values, a positive quantization offset acts to shift each bin to the right and a negative quantization offset acts to shift each bin to the left. A quantization offset may be applied in combination with a deadzone. In one case, a deadzone may be applied based on a first set of thresholds, e.g. all values less than (n*stepwidth)/2 and greater than (n*stepwidth*−1)/2 are set to 0.

In some examples, the quantization offset may be signalled to the decoder for use in dequantization.

In one case, at the encoder, a quantization offset may be subtracted from a residual or coefficient value before quantization based on a stepwidth. Hence, in the decoder, a signalled offset may added to a received quantized value for dequantization based on a stepwidth. In certain cases, the offset may be adjusted based on a sign of the residual or coefficient to allow for symmetrical operations about a 0 value. In one case, use of an offset may be disabled by setting a quantization or dequantization offset value to 0. In one case, an applied quantization offset may be adjusted based on a defined deadzone width. In one case, a deadzone width may be computed at the decoder, e.g. as a function of stepwidth and quantization parameters received from the encoder.

In one case, a stepwidth for quantization may be varied for different coefficients within a 2×2 or 4×4 block of coefficients. For example, a smaller stepwidth may be assigned to coefficients that are experimentally determined to more heavily influence perception of a decoded signal, e.g. in a 2×2 or 4×4 Directional Decomposition (DD-Squared or "DDS") as described above A, H, V and D coefficients may be assigned smaller stepwidths with later coefficients being assigned larger stepwidths. In this case, a base_stepwidth parameter may be defined that sets a default stepwidth and then a modifier may be applied to this to compute a modified_stepwidth to use in quantization (and de-quantization), e.g. modified_stepwidth=base_stepwidth*modifier (where "modifier" may be set based on a particular coefficient within a block or unit and may be derived from signalling such as the variable "qm" described below).

In certain cases, the modifier may also, or alternatively, be dependent on a level of enhancement. For example, a stepwidth may be smaller for the level 1 enhancement stream as it may influence multiple reconstructed pixels at a higher level of quality.

In certain cases, modifiers may be defined based on both a coefficient within a block and a level of enhancement. In one case, a quantization matrix may be defined with a set of modifiers for different coefficients and different levels of enhancement. This quantization matrix may be preset (e.g. at the encoder and/or decoder), signalled between the encoder and decoder, and/or constructed dynamically at the encoder and/or decoder. For example, in the latter case, the quantization matrix may be constructed at the encoder and/or decoder as a function of other stored and/or signalled parameters, e.g. those received via a configuration interface.

In one case, different quantization modes, or different schemes defining the quantization matrix that is to be applied to a given set of coefficients, may be defined. In one mode a common quantization matrix may be used for both levels of enhancement; in another mode, separate matrices may be used for different levels; in yet another mode, a quantization matrix may be used for only one level of enhancement, e.g. just for level 2. The quantization matrix may be indexed by a position of the coefficient within the block (e.g. 0 or 1 in the x direction and 0 or 1 in the y direction for a 2×2 block, or 0 to 3 for a 4×4 block).

In one case, a base quantization matrix may be defined with a set of values. This base quantization matrix may be modified by a scaling factor that is a function of a stepwidth for one or more of the enhancement levels. In one case, a scaling factor may be a clamped function of a stepwidth variable. At the decoder, the stepwidth variable may be received from the encoder for one or more of the level-2 stream and the level-1 stream.

By way of some further examples of processes that involve the above described principles, the advantageous modes of configuring and adapting the quantization in order to improve the encoding and decoding procedures further may be understood in further view of the following. Data block unit enhancement payload semantics may be applied, involving a number of parameters with which properties of the quantization and dequantization steps can be signalled and configured.

In an example, the parameter dequant_offset_signalled specifies whether the value of the offset parameter to be applied when dequantizing is signalled. In this way, it may be signalled whether the offset is sent. In this example, if the offset is sent, then it is used. If it is not sent, then a default offset, or no offset may be used.

In an example of a method of encoding an input video into a plurality of encoded streams, wherein the encoded streams may be combined to reconstruct the input video, the method may involve receiving an input video, and downsampling the input video to create a downsampled video.

The method typically further includes instructing an encoding of the downsampled video using a base encoder to create a base encoded stream, the base encoded stream; instructing a decoding of the base encoded stream using a base decoder to generate a reconstructed video; comparing the reconstructed video to the downsampled video to create a first set of residuals; and, encoding the first set of residuals to create a first level encoded stream. This preferably includes: applying a transform to the set of residuals to create a set of coefficients; applying a quantization operation to the set of coefficients to create a set of quantized coefficients; and applying an encoding operation to the quantized coefficients, wherein the quantization operation is performed using a quantization matrix, the quantization matrix being derived in accordance with an obtained value of a quantization matrix mode parameter.

As described earlier in this disclosure, a quantization matrix mode parameter can be advantageously used to specify the quantization matrix to be used in the encoding process. In some examples, when the quantization matrix mode parameter value is equal to a predetermined value, for example when it is equal to zero, 0, the methods may involve using a default quantization matrix for each of two levels of quality. These levels are typically, or typically correspond to, level 1 and level 2 enhancement streams. When the quantization matrix mode parameter value is equal to 1, a first quantization matrix may be used for each of the two levels of quality, and the first quantization matrix may be signalled, for example, from the encoder to a decoder or a device to which the encoded stream is to be transmitted. When the quantization matrix mode parameter value is equal to 2, a second quantization matrix can be used for level of quality 2, and the second quantization matrix may be signalled. In this case, no quantization matrix may be used for level of quality 1, or default values may be used for this level. When the quantization matrix mode parameter value is equal to 3, a third quantization matrix is preferably used for level of quality 1, or the first level encoded stream, and the third quantization matrix is signalled. In this case, no quantization matrix may be used for level of quality 2, or default values may be used for this level. When the quantization matrix mode parameter value is equal to 4, a fourth quantization matrix may be used for the first level encoded stream and a fifth quantization matrix may be used for the second level encoded stream (e.g. two matrices may be used), each of which can be equal or unequal to each other and any of the aforementioned first to third matrices. In this fifth mode, the fourth quantization matrix and the fifth quantization matrix may be signalled to a decoder or other device to which the encoded stream is to be transmitted.

In the procedures described in this disclosure, as alluded to above, every group of transform coefficients passed to this process typically belongs to a specific plane and layer. Typically, they have been scaled using a linear quantizer which in some examples uses a non-centred dequantization offset. A scaling process for the transform coefficients may be applied as follows. The process may take location information for a block, together with a set of parameters by which properties of the block, such as its size, the properties of the quantization operation, such as step width and offset value, and the level of enhancement to which it applies, may be indicated. For instance, a location, which may be indicated with a pair of coordinate values, or for example parameters (xTbP, yTbP) specifying the top-left sample of the current luma or chroma transform block relative to the top left luma or chroma sample of the current picture may be used. This can be related to a particular portion of data representative of an image, and may for instance be related either to a luma plane or a chroma plane, depending on the plane to which the transform coefficients belong.

The aforementioned parameter specifying the size of a current transform block, which may be called nTbS in some examples, may have a value that is dependent upon the type of transform, and in particular upon the value of a parameter that defines, the transform used for decoding. This type parameter may be called transform type in some examples, and in some applications may have a value of 0, 1, or 2-3, respectively corresponding to a 2×2 directional decomposition transform, a 4×4 directional decomposition transform, or a value or parameter specifying that the values are zero as those elements are not used in the bitstream. In some examples this transform type parameter having a value of 0, may correspond to a number of layers being equal to 4 and if transform type is equal to 1 the corresponding number of layers value may be 16. The size, nTbS, parameter may have a value of 2 if the transform type is equal to zero and may have a value of 4 if transform type is equal to 1.

A further input to the process is typically in the form of an array of entropy decoded quantized coefficients. This may be called TransCoeffQ, and be of a size related to the size parameter noted above, in particular having dimensions (nTbS)×(nTbS), i.e. the array may comprise a coding unit or block as described herein. This array may be called TransCoeffQ. The stepwidth value may be specified with a parameter called stepWidth. The index of the level of enhancement may be specified by a parameter also, and in some examples may be called idxLevel. If a dequantization offset is to be used, this may be specified with a parameter, for example called dQuantOffset. The parameter typically specifies the value of the dequantization offset parameter to be applied. This process typically results in an array of dequantized transform coefficients. This may for example be in the form of an array of dimensions (nTbS)×(nTbS) containing elements d[x][y].

The values in the output array, which may be called d[x][y], are typically derived based upon the stepwidth, as described above for example, and/or any of the index of the level of enhancement, as applied to the quantization matrix, which may be referred to as qm, and the entropy decoded quantized coefficients, which may be named TransCoeffQ[xTbP][yTbP] for the corresponding element. Additionally, the values of the output array elements may be derived by way of additionally applying an offset to the result of the aforementioned operation. For example, a parameter, which may be named appliedOffset, may be added to the value to produce the output element value.

This may therefore involve the following relation to calculate each element d of the array:

$$d[x][y]=(\text{TransCoeffQ}[x\text{TbP}][y\text{TbP}]*(\text{stepWidth}*qm[y\text{TbP}+(\text{idxLevel}*4)][x\text{TbP}]))+\text{appliedOffset}$$

In the above calculation, which is one example of how dequantization may be performed at a decoder, idxLevel may be 0 or 1 representing levels 2 and 1 respectively. In the above calculation, and as described in other examples herein, a value from the quantization matrix is selected based on a particular coefficient and a particular level of enhancement.

With regard to the offset that may be applied in some examples, as shown in the relation above, this parameter, which may be called appliedOffset, is typically derived as follows below.

In certain cases, the appliedOffset may be conditionally applied based on whether residual filtering is to be applied. This filtering may be applied following the inverse transformation (e.g. 410-1 in FIG. 6) and may be a deblocking filter. In these cases, an offset may only be applied if residual filtering is applied. For example, if a parameter that specifies whether deblocking filter should be applied, which may be named deblocking signalled, has a particular value, for example is equal to 1, calculating the offset based on the aforementioned parameter specifying the dequantization offset, which may be named dQuantOffset.

The appliedOffset may also be derived from a single value of dQuantOffset and adapted for application to positive and negative coefficient values. For instance, appliedOffset may be configured as a negative or positive value, typically having the same absolute value as the dequantization offset parameter and having a positive or negative sign respectively. This may be applied if the TransCoeffQ value has a value less than zero; otherwise, if the TransCoeffQ value is greater than zero, the applied offset may be assigned a value equal to that of the dequantization offset parameter. If the TransCoeffQ value is equal to zero, then the applied offset may be assigned a zero value also.

Thus, in certain examples, the derivation of the offset that may be added to obtain the output array elements may be derived by (where TransCoeffQ may be an array, typically of size (nTbS)×(nTbS), containing entropy decoded quantized coefficients):

```
If deblocking_signalled is equal to 1
    If TransCoeffQ[ xTbP ][ yTbP ] < 0
        appliedOffset = (dQuantOffset * −1)
    else If TransCoeffQ [ xTbP ][ yTbP ] > 0
        appliedOffset = dQuantOffset
    else
        appliedOffset = 0
else
    appliedOffset = 0
```

By way of an example, a parameter or set of parameters may be signalled as described above and used to specify how the quantization matrix is to be applied to a set of coefficients. This parameter may be a quant_matrix_mode parameter, which specifies which quantization matrix to be used in the decoding process in accordance with Table 1 below. The parameter may be one byte. The quant_matrix_mode parameter may be used to configured how the quantization matrix is derived (e.g. as described later below).

TABLE 1

Quantization matrix

| quant_matrix_mode | Value of type |
|---|---|
| 0 | Both levels of quality use default matrices |
| 1 | One matrix of modifiers is signalled and should be used on both levels of quality |
| 2 | One matrix of modifiers is signalled and should be used on level of quality 2 |
| 3 | One matrix of modifiers is signalled and should be used on level of quality 1 |
| 4 | Two matrices of modifiers are signalled - the first one for level of quality 2, the second for level of quality 1 |
| 5-7 | Reserved_zeros |

Quantization matrix data semantics may be applied according to the following specific example. A quantization matrix, which may be referred to as qm [y][x], is derived.

The matrix qm may have dimensions k*M by N. That is to say, the matrix may be defined as corresponding to quantization coefficients contained in a M by N matrix, and qm may contain this data in the form of a respective M by N matrix of quantization coefficients for example, for each of k levels of enhancement.

In the present examples, two levels of enhancement are involved, namely levels 1 and 2 as described in this disclosure, and k is equal to 2. The largest transform as described in relation to these procedures is 4×4, and so M and N may each be equal to 4.

In some examples, by defining qm with M and N values that correspond to the largest available transform, which is a 4×4 transform in these examples as alluded to above, thus comprising 16 coefficients, the application of the quantization matrix where a smaller transform is employed may be performed by reading from qm, and applying, a subset of the coefficients in the respective M by N matrix.

In a specific example, if the value of the quantization matrix mode parameter is equal to zero, namely if quant_matrix_mode is equal to 0, then the following default quantization matrix is used in the quantization operation:

$qm[y][x]$={0.500 0.500 0.500 0.617}{0.862 0.610 1.064 0.781}{0.500 0.500 0.500 0.617}{3.125 1.851 1.851 1.316}{0.500 0.500 0.500 0.617}{0.862 0.610 1.064 0.781}{0.862 1.064 0.610 0.781}{3.125 1.851 1.851 1.316}, wherein y=0 . . . 3 are coefficients to be used for the level 2 of the enhancement and y=4 . . . 7 are coefficients to be used for the level 1 of the enhancement; and if the value of the quantization matrix mode parameter is equal to 1, one matrix of modifiers is signalled is used on both levels of enhancement. A matrix may be built by way of an interactive process in some applications. Thus qm[x][y] values may be obtained row-by-row, whereby for each row, with a value in that row and for each column of the matrix is populated as the row is processed. A stepwidth modifier parameter may be used in obtaining these matrix values, as described below. In the present example, the number of rows to be populated may be 8, with the number of columns being equal to 4, as described above in connection with the matrix dimensions in this specific example. In particular, the iterative process for this example may be written as:

for ($y$=0;$y$<8;$y$++)

for ($x$=0;$x$<4;$x$++)

$qm[y][x]$=step_width_modifier_2[$x$+$y$*4], wherein stepwidth modifier parameter, which may be called step_width_modifier_2 in this example, is a parameter specifying the values of level 2 enhancement 16 coefficients to be applied at the different layers of the transform coefficients; and if the value of the quantization matrix mode parameter is equal to 2, one matrix of modifiers is signalled and is used on level of enhancement 2. Likewise an iterative procedure corresponding to that described above may be used, in particular:

for ($y$=0;$y$<4;$y$++)

for ($x$=0;$x$<4;$x$<4)

$qm[y][x]$=step_width_modifier_2[$x$+$y$*4]; and if the value of the quantization matrix mode parameter is equal to 3, one matrix of modifiers is signalled and is used on level of enhancement 1:

for ($y$=0;$y$<4;$y$++)

for ($x$=0;$x$<4;$x$<4)

$qm[y+4][x]$=step_width_modifier_2[$x$+$y$*4]; and if the value of the quantization matrix mode parameter is equal to 4, two matrixes of modifiers are signalled, the first one for level of enhancement 2, the second for level of enhancement 1:

for (y=0;y<4;y++)

for (x=0;x<4;x<4)

qm[y][x]=step_width_modifier_2[x+y*4]

for (y=0;y<4;y++)

for (x=0;x<4;x<4)

qm[y][x]=step_width_modifier_1[x+y*4], wherein step_width_modifier_1 is a parameter specifying the values of level 1 enhancement 16 coefficients to be applied at the different layers of the transform coefficients.

As described above, the values of d[x][y] in the matrix may be calculated for example as the product of the respective transform coefficient at the relevant element in the matrix and a sum of the corresponding quantization matrix element value at a column identified by a product of a parameter specifying the size of a current transform block and a levelIdxSwap parameter, and in the corresponding row, and the stepwidth modifier parameter value corresponding to that element, with the above described offset typically being additively applied to that product also.

The above described dequantization process may be performed in accordance with the following ordered steps. The dequantization process as per the aforementioned examples may be invoked with the luma location (xTbY, yTbY), the transform size set equal to nTbS, namely the size of a current transform block, the array TransCoeffQ, as described above, of a size (nTbS)×(nTbS), and the step width parameter as inputs. The output may then be an array of dequantized coefficients (e.g. dequantized transformed residuals) of dimensions (nTbS)×(nTbS), which may be referred to a dequantCoeff in this example.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of encoding an input video into a plurality of encoded streams, wherein the encoded streams may be combined to reconstruct the input video, the method comprising:
   receiving an input video;
   downsampling the input video to create a downsampled video;
   instructing an encoding of the downsampled video using a base encoder to create a base encoded stream;
   instructing a decoding of the base encoded stream using a base decoder to generate a reconstructed video;
   comparing the reconstructed video to the downsampled video to create a first set of residuals;
   decoding the first set of residuals to generate a decoded first set of residuals;
   correcting the reconstructed video using the decoded first set of residuals to generate a corrected reconstructed video;
   upsampling the corrected reconstructed video to generate an up-sampled reconstructed video;
   comparing the up-sampled reconstructed video to the input video to create a second set of residuals;
   encoding the first set of residuals to create a first level encoded stream and encoding the second set of residuals to create a second level encoded stream, the encoding including:
      applying a respective transform to the first set of residuals and the second set of residuals to create a respective first set of coefficients and a second set of coefficients;
      applying a respective quantization operation to the first set of coefficients and the second set of coefficients to create a first set of quantized coefficients and a second set of quantized coefficients; and
      applying a respective encoding operation to the first set of quantized coefficients and the second set of quantized coefficients,
   wherein applying the quantization operation comprises:
      respectively adapting the quantization according to the first set of coefficients and the second set of coefficients to be quantized, including varying a stepwidth used for different ones of the first set of coefficients and the second set of coefficients,
   wherein a first set of parameters and a second set of parameters derived from the adapting is signalled to a decoder to enable dequantization of the first set of quantized coefficients and the second set of quantized coefficients.

2. The method of claim 1, wherein one or more of the first set of parameters and the second set of parameters are signalled using a quantization matrix.

3. The method of claim 2, comprising:
   transmitting a quantization matrix mode parameter indicating how values within the quantization matrix are to be applied to one or more of the first set of coefficients and the second set of coefficients.

4. The method of claim 3, wherein the quantization matrix mode parameter indicates one of the following modes:
- a first mode wherein the decoder is to use a set of values within the quantization matrix for both the first level encoded stream and the second level encoded stream;
- a second mode wherein the decoder is to use a set of values within the quantization matrix for the first level encoded stream;
- a third mode wherein the decoder is to use a set of values within the quantization matrix for the second level encoded stream; and
- a fourth mode wherein two quantization matrices are signalled for each of the first level encoded stream and the second level encoded stream.

5. The method of claim 1, wherein the first and second set of parameters comprise signalling to indicate that a default set of one or more quantization matrices are to be used at the decoder.

6. The method of claim 1, comprising:
- combining at least the first level encoded stream and the second level encoded stream into a combined encoded stream; and
- transmitting the combined encoded stream to the decoder for use in reconstructing the input video together with a received base encoded stream.

7. The method of claim 6, wherein the combined encoded stream comprises the base encoded stream.

8. The method of claim 1, wherein applying the quantization operation comprises quantizing coefficients using a linear quantizer, wherein the linear quantizer uses a dead zone of variable size.

9. The method of claim 1, wherein the quantization operation further comprises using a quantization offset.

10. The method of claim 9, wherein the quantization offset is selectively signalled to the decoder.

11. The method of claim 1, comprising adapting the distribution used in the quantization step.

12. The method of claim 1, wherein adapting the quantization is predetermined and/or selectively applied based on analysis of any one or more of: the input video, a downsampled video, a reconstructed video, and an upsampled video.

13. The method of claim 1, wherein adapting the quantization is selectively applied based on a predetermined set of rules and/or determinatively applied based on an analysis or feedback of decoding performance.

14. The method of claim 1, wherein encoding residuals comprises applying the encoding to blocks of residuals that are associated with a frame of the input video, wherein each block is encoded without using image data from another block in the frame such that each block is encodable in parallel, wherein each element location in the block has a respective quantization parameter for varying the stepwidth.

15. A method of generating a reconstructed output video, the method comprising:
- receiving a first base encoded stream;
- instructing a decoding operation on the first base encoded stream using a base decoder to generate a first output video;
- receiving a first level encoded stream a second level encoded stream;
- decoding the first level encoded stream and the second level encoded stream to obtain a first set of residuals and a second set of residuals; and,
- combining the first set of residuals with the first output video to generate a reconstructed video, and combining the second set of residuals with an unsampled version of the reconstructed video to generate a reconstruction of an original resolution input video, wherein decoding the first level encoded stream and the second level encoded stream comprises:
- decoding a first set of quantized coefficients from the first level encoded stream and a second set of quantized coefficients from the second level encoded stream;
- obtaining a first set of parameters and a second set of parameters respectively indicating how to dequantize the first set of quantized coefficients and the second set of quantized coefficients; and
- respectively dequantizing the first set of quantized coefficients and the second set of quantized coefficients using the first set of parameters and the second set of parameters, wherein different ones of the first set of quantized coefficients and the second set of quantized coefficients are dequantized using respective dequantization parameters, and wherein obtaining the first set of parameters comprises:
- obtaining a quantization mode parameter that is signalled with the first level encoded stream; and
- responsive to a first value of the quantization mode parameter, using a default quantization matrix as the first set of parameters.

16. The method of claim 15, wherein obtaining the first set of parameters further comprises:
- responsive to other values of the quantization mode parameter, obtaining a quantization matrix that is signalled with the first level encoded stream and using quantization matrix as the first set of parameters.

17. The method of claim 15, wherein decoding the first level encoded stream comprises:
- prior to dequantizing the first set of quantized coefficients, applying an entropy decoding operation to the first level encoded stream; and
- after dequantizing the first set of quantized coefficients, applying an inverse transform operation to generate the first set of residuals.

18. The method of claim 15, wherein obtaining the first and second set of parameters comprises:
- obtaining a quantization matrix that is signalled with one or more of the first and second level encoded streams, and
- dequantizing comprises, for a plurality of quantized coefficient elements within a block of quantized coefficients for a frame of video, a block corresponding to a n by n grid of picture elements, a frame comprising multiple blocks that cover the spatial area associated with the frame:
  - obtaining a quantization parameter from the quantization matrix based on a location of a given quantized coefficient element; and
  - using the quantization parameter to dequantize the given quantized coefficient element.

19. The method according to claim 15, wherein dequantizing comprises using a linear dequantization operation and applying a non-centered de-quantization offset.

20. A non-transitory computer-readable storage medium storing instructions that, when executed by a processor, cause the processor to perform a method of encoding an input video into a plurality of encoded streams, wherein the encoded streams may be combined to reconstruct the input video, the method comprising:

receiving an input video;

downsampling the input video to create a downsampled video;

instructing an encoding of the downsampled video using a base encoder to create a base encoded stream;

instructing a decoding of the base encoded stream using a base decoder to generate a reconstructed video;

comparing the reconstructed video to the downsampled video to create a first set of residuals;

decoding the first set of residuals to generate a decoded first set of residuals;

correcting the reconstructed video using the decoded first set of residuals to generate a corrected reconstructed video;

upsampling the corrected reconstructed video to generate an up-sampled reconstructed video;

comparing the up-sampled reconstructed video to the input video to create a second set of residuals;

encoding the first set of residuals to create a first level encoded stream and encoding the second set of residuals to create a second level encoded stream, the encoding including:

applying a respective transform to the first set of residuals and the second set of residuals to create a respective first set of coefficients and a second set of coefficients;

applying a respective quantization operation to the first set of coefficients and the second set of coefficients to create a first set of quantized coefficients and a second set of quantized coefficients; and applying a respective encoding operation to the first set of quantized coefficients and the second set of quantized coefficients, wherein applying the quantization operation comprises:
respectively adapting the quantization according to the first set of coefficients and the second set of coefficients to be quantized, including varying a step-width used for different ones of the first set of coefficients and the second set of coefficients, wherein a first set of parameters and a second set of parameters derived from the adapting is signalled to a decoder to enable dequantization of the first set of quantized coefficients and the second set of quantized coefficients.

* * * * *